United States Patent
Zhu et al.

(10) Patent No.: US 11,288,253 B2
(45) Date of Patent: Mar. 29, 2022

(54) ALLOCATION METHOD AND DEVICE FOR A DISTRIBUTED LOCK

(71) Applicant: ALIBABA GROUP HOLDING LIMITED, Grand Cayman (KY)

(72) Inventors: Yunfeng Zhu, Hangzhou (CN); Haoran Yang, Hangzhou (CN); Yijun Lu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 309 days.

(21) Appl. No.: 16/014,444

(22) Filed: Jun. 21, 2018

(65) Prior Publication Data

US 2018/0373750 A1    Dec. 27, 2018

(30) Foreign Application Priority Data

Jun. 21, 2017   (CN) .......................... 201710476716.2

(51) Int. Cl.

| | |
|---|---|
| *G06F 16/00* | (2019.01) |
| *G06F 16/23* | (2019.01) |
| *G06F 11/18* | (2006.01) |
| *H04L 67/01* | (2022.01) |
| *H04L 67/1074* | (2022.01) |
| *G06F 9/52* | (2006.01) |
| *H04L 67/10* | (2022.01) |
| *H04L 67/145* | (2022.01) |

(52) U.S. Cl.
CPC .......... *G06F 16/2343* (2019.01); *G06F 9/526* (2013.01); *G06F 11/185* (2013.01); *H04L 67/10* (2013.01); *H04L 67/1076* (2013.01); *H04L 67/145* (2013.01); *H04L 67/42* (2013.01)

(58) Field of Classification Search
CPC .... G06F 16/2343; G06F 9/526; G06F 11/185; G04L 67/10; H04L 67/1076; H04L 67/145; H04L 67/42
USPC ......................................... 707/704
See application file for complete search history.

(56) References Cited

U.S. PATENT DOCUMENTS

| | | | |
|---|---|---|---|
| 6,145,094 A * | 11/2000 | Shirriff | G06F 11/2038 709/226 |
| 9,614,891 B1 * | 4/2017 | Evenson | H04L 67/02 |
| 9,632,828 B1 * | 4/2017 | Mehta | G06F 16/2343 |

(Continued)

FOREIGN PATENT DOCUMENTS

| | | |
|---|---|---|
| CN | 104702655 A | 6/2015 |
| CN | 106354565 A | 1/2017 |

(Continued)

OTHER PUBLICATIONS

First Chinese Search Report issued in corresponding Chinese Application No. 201710476716.2 dated Apr. 27, 2021 (2 pages).

*Primary Examiner* — Monica M Pyo
(74) *Attorney, Agent, or Firm* — Finnegan, Henderson, Farabow, Garrett & Dunner, LLP

(57) ABSTRACT

A method and device for allocating a distributed lock is provided. A globally unique service process ID (SPI) is introduced for each distributed application service process while guaranteeing correctness of a distributed lock, and the SPI is used to directly manage ownership of the distributed lock. The service replacement process sends to the server a request for inheriting ownership of the distributed lock before the lifecycle of the lock file expires, the inherit request including the SPI.

19 Claims, 6 Drawing Sheets

(56) References Cited

U.S. PATENT DOCUMENTS

| | | | | |
|---|---|---|---|---|
| 9,984,140 | B1* | 5/2018 | Sukumaran | G06F 16/219 |
| 10,152,481 | B1* | 12/2018 | Singh | G06F 16/122 |
| 10,169,367 | B2* | 1/2019 | Lin | G06F 16/1774 |
| 10,225,778 | B2* | 3/2019 | Yu | H04W 48/18 |
| 2010/0114848 | A1* | 5/2010 | Mckelvie | G06F 16/2365 |
| | | | | 707/704 |
| 2010/0185898 | A1* | 7/2010 | Chan | G06F 13/105 |
| | | | | 714/24 |
| 2012/0310881 | A1* | 12/2012 | Shadmon | G06F 16/273 |
| | | | | 707/613 |
| 2012/0311391 | A1* | 12/2012 | Abdul | G06F 11/0784 |
| | | | | 714/48 |
| 2013/0066948 | A1* | 3/2013 | Colrain | H04L 67/42 |
| | | | | 709/203 |
| 2014/0365549 | A1* | 12/2014 | Jenkins | G06F 9/5077 |
| | | | | 709/201 |

FOREIGN PATENT DOCUMENTS

| | | |
|---|---|---|
| CN | 106572130 A | 4/2017 |
| CN | 106708608 A | 5/2017 |
| CN | 107145396 A | 9/2017 |
| CN | 107203429 A | 9/2017 |

* cited by examiner

| Hostname | ID |

Service Process Id (SPI)

ALLOCATION METHOD AND DEVICE FOR A DISTRIBUTED LOCK

CROSS-REFERENCE TO RELATED APPLICATION

This application is based upon and claims priority to Chinese Patent Application No. 201710476716.2, filed on Jun. 21, 2017, the disclosure of which is expressly incorporated herein by reference in its entirety.

TECHNICAL FIELD

The present disclosure relates to the field of computers, and in particular, to an allocation method and device for a distributed lock.

BACKGROUND

In a large-scale cloud computing scenario, numerous computing nodes generally use a distributed lock service to synchronize accesses to a shared resource or coordinate behaviors or actions between computing nodes, so as to guarantee distributed consensus of data. Currently, renowned products in the industry that support the distributed lock service include Google Chubby, Yahoo Zookeeper, CoreOS Etcd, and the like.

The distributed lock service is broadly used in the large-scale cloud computing scenario. Client processes distributed on different computing nodes generally use a distributed lock to access a shared resource of a server, thus guaranteeing distributed consensus of data. A typical distributed lock service is implemented based on an Ephemeral file (lock file) operation interface provided by a distributed consensus system. Specifically, contention for a distributed lock is designed based on creation of an Ephemeral file operation interface, and the distributed lock can be released by deleting the Ephemeral file operation interface.

A quorum is a set of servers in a distributed consensus system. Each quorum server maintains a memory database of the distributed consensus system, as well as permanently stored transaction logs and snapshot data. The concept of owner of the Ephemeral file in the distributed consensus system guarantees exclusiveness of the distributed lock. The quorum server records session information corresponding to a client process that creates an Ephemeral file. When another client process attempts to create an Ephemeral file that already exists, the quorum server checks the session to which the Ephemeral file belongs and finds that the session does not match the session corresponding to the client process attempting to create the Ephemeral file. The quorum server then informs the client that the file creation has failed, i.e., contention for the distributed lock has failed.

A session is a globally unique session registered by a client on a server in the distributed consensus system. Lifetimes of sessions on the client and server are updated respectively by using periodic heartbeats of the client and the server. The concept of lifetime of the Ephemeral file (lock file) in the distributed consensus system further guarantees final usability of the distributed lock. The Ephemeral file (lock file) is a temporary file in the distributed consensus system. This type of file belongs to a session and can be operated only by this session. This type of file is deleted from the server automatically once the corresponding session expires at the server. The lifetime of the Ephemeral file, i.e., the lifetime of the session to which it belongs, is updated by using periodic heartbeats of the client process and the quorum server. If no heartbeat packet response from the quorum server is received within a session timeout period determined by the client, the client process determines that the session has timed out and determines that the lock is lost. Then, if the quorum server does not receive any heartbeat packet from the client process within a session timeout period determined by the quorum server, the quorum server determines that the session has timed out, deletes the lock file automatically, and releases the ownership of the distributed lock.

In the current session-based ownership management mechanism for the distributed lock, the session is coupled to a connection established between the client process and the quorum server. Therefore, when failover occurs in a business service process that owns the distributed lock, a restarted client process establishes a new connection with the quorum server and creates a new session on the connection. The client process contends for the ownership of the distributed lock based on the new session. In fact, in the session-based lifetime management mechanism for the distributed lock, a distributed lock occupied by a client process that crashes is still retained for a period of time at the quorum server, to guarantee correctness of the distributed lock. Therefore, the restarted service process cannot contend for the ownership of the distributed lock within this period of time. From the business perspective, a failover scenario results in a time window in which the business is out of service, due to the unavailability of the distributed lock for a period of time.

The lifetime of the distributed lock, i.e., the lifetime of the session coupled to the connection established between the client owning the distributed lock and the quorum server, is updated by using periodic heartbeats between the client and the quorum server. If heartbeats are not received within their respective session timeout periods, the client and the quorum server separately determine that the session has timed out. Here, the quorum server can determine a session as expired after a client determines that the session has expired. Otherwise, the quorum server determines that the session has timed out and then releases the distributed lock while the client still considers that it owns the distributed lock corresponding to the session. This would lead to other clients all succeeding in lock contention, causing data inconsistency as multiple clients consider that they occupy the same distributed lock. Therefore, the client needs to negotiate with the quorum server about reasonable session expiration periods on both sides.

FIG. 1 shows a worst-case scenario in which the quorum server starts a new session lifetime at the quorum server upon reception of a heartbeat from the client. The client receives a heartbeat response from the quorum server right before the session has timed out at the client. The client also starts a next session lifetime, and continues to send a heartbeat. If the heartbeat packet is lost due to abnormality, the client determines that the session at the client expires when the second session lifetime of the client expires. In this case, the quorum server that has been waiting for a heartbeat should also determine that the session at the quorum server expires. Therefore, the session lifetime at the quorum server is at least twice the duration of the session lifetime at the client, so as to guarantee that the client and the quorum server can maintain a distributed consensus when determining the session validity for the same distributed lock.

In distributed application services, failover is a common event in an application service process. FIG. 2 shows an existing solution in which an application process owning a distributed lock serves continuously in a failover scenario.

An original service process Client A establishes a connection to create a session, and then contends for ownership of a distributed lock. Then, Client A maintains session validity, i.e., the ownership of the distributed lock, by using periodic heartbeats with a quorum server. When failover occurs, a new service process Client A' is started. Client A' also needs to establish a connection to the quorum server and create a new session on the connection. Client A' contends for the ownership of the original distributed lock based on the new session, and can finally succeed in the contention to resume the business service.

In the existing solution, the client process in which failover occurs disconnects from the quorum server, but the session coupled to the connection, i.e., the actual owner of the distributed lock, has not yet expired at the quorum server and therefore still survives at the server. The newly started client process can establish a new connection with the quorum server and create a new session on the new connection. The newly created session is not the actual owner of the distributed lock, and therefore, the new client process fails in contention for the distributed lock.

As shown in FIG. 3, when failover occurs in a business service client process, the part that has elapsed in the session lifetime corresponding to the quorum server is the period from the moment when the quorum server receives the previous heartbeat to the moment when the failover occurs in the client process. Specifically, as can be seen from analysis of FIG. 3, the maximum value of the remaining session lifetime of the quorum server is actually approximate to the whole session lifetime of the session at the quorum server, i.e., a waiting time for contention for the distributed lock as shown by the dashed-line part in FIG. 3.

Therefore, the newly started business service client process waits for expiration of the original session at the quorum server. After the ownership of the distributed lock is released by the quorum server, the newly started business service client process can contend for the distributed lock to resume the business service. In other words, according to the current technical solution, there is a clear time window in which the business service process is unavailable in a failover scenario.

SUMMARY

According to some embodiments of the present disclosure, an allocation method for a distributed lock at a client is provided. The method includes allocating a unique service process ID (SPI) to a service process, wherein the service process sends a request to a server to write the SPI into a lock file having a lifecycle for a distributed lock. The method also includes, upon detecting a service process crash, starting a service replacement process for allocating the SPI of the crashed service process to the service replacement process. The method further includes sending, by the service replacement process, a request for inheriting ownership of the distributed lock to the server before the lifecycle of the lock file expires, the request including the SPI.

According to some embodiments of the present disclosure, an allocation method for a distributed lock at a server is further provided. The method includes creating a lock file having a lifecycle for a distributed lock according to a lock file creation request received from a service process of a client. The method also includes writing a unique SPI of the service process into the lock file according to an SPI writing request received from the service process and initiating, upon a service process crash is detected, a service replacement process for allocating the SPI of the crashed service process to the service replacement process. The method further includes acquiring a distributed lock inherit request sent by the service replacement process before the lifecycle of the lock file expires. The inherit request includes the SPI. Additionally, the method includes determining whether the SPI of the service replacement process is consistent with an SPI in the lock file, and in response to the SPI of the service replacement process being consistent with the SPI in the lock file, creating a new lock file of the distributed lock for the service replacement process.

According to some embodiments of the present disclosure, a client is provided. The client includes a creation request apparatus configured to allocate a unique SPI to a service process, wherein the service process sends a request to a server to write the SPI into a lock file having a lifecycle for a distributed lock. The client also includes a failover apparatus configured to, upon a service process crash is detected, start a service replacement process for allocating the SPI of the crashed service process to the service replacement process. The client further includes an inherit request apparatus configured to enable the service replacement process to send a request for inheriting ownership of the distributed lock to the server before the lifecycle of the lock file expires, the request including the SPI.

According to some embodiments of the present disclosure, a server is further provided. The server includes a creation apparatus configured to create a lock file having a lifecycle for a distributed lock according to a lock file creation request received from a service process of a client. The server also includes a writing apparatus configured to write a unique SPI of the service process into the lock file according to an SPI writing request received from the service process. Upon a service process crash is detected, a service replacement process is initiated for allocating the SPI of the crashed service process to the service replacement process. The server further includes an allocation apparatus configured to acquire a distributed lock inherit request sent by the service replacement process before the lifecycle of the lock file expires, the request including the SPI. The allocation apparatus is also configured to determine whether the SPI of the service replacement process is consistent with an SPI in the lock file, and in response to the SPI of the service replacement process being consistent with the SPI in the lock file, create a new lock file of the distributed lock for the service replacement process.

According to some embodiments of the present disclosure, a computing-based device is further provided, including a processor and a memory. The memory is configured to store computer executable instructions. The processor is configured to execute the instructions to cause the computing-based device to allocate a unique SPI to a service process, wherein the service process sends a request to a server to write the SPI into a lock file having a lifecycle for a distributed lock. The processor is also enabled to, upon a service process crash is detected, start a service replacement process for allocating the SPI of the crashed service process to the service replacement process. The processor is further enabled to enable the service replacement process to send a request for inheriting ownership of the distributed lock to the server before the lifecycle of the lock file expires, the request including the SPI.

According to some embodiments of the present disclosure, a computing-based device is further provided, including a processor and a memory. The memory is configured to store computer executable instructions. The processor is configured to execute the instructions to cause the computing-based device to create a lock file having a lifecycle for a distributed lock according to a lock file creation request received from a service process of a client. The processor is also enabled to write a unique SPI of the service process into the lock file according to an SPI writing request received from the service process, wherein upon a service process crash is detected, a service replacement process is initiated for allocating the SPI of the crashed service process to the service replacement process. The processor is further enabled to acquire a distributed lock inherit request sent by the service replacement process before the lifecycle of the lock file expires. The inherit request includes the SPI of the service replacement process. Additionally, the processor is enabled to determine whether the SPI of the service replacement process is consistent with an SPI in the lock file, and in response to the SPI of the service replacement process is consistent with the SPI in the lock file, create a new lock file of the distributed lock for the service replacement process.

According to some embodiments of the present disclosure, a non-transitory computer-readable storage medium storing a set of instructions is further provided. When executed by one or more processors of an electronic device, the set of instructions causes the electronic device to perform a method. The method includes allocating a unique SPI to a service process, wherein the service process sends a request to a server to write the SPI into a lock file having a lifecycle for a distributed lock. The method also includes, upon detecting a service process crash, starting a service replacement process for allocating the SPI of the crashed service process to the service replacement process. The method further includes enabling the service replacement process to send a request for inheriting ownership of the distributed lock to the server before the lifecycle of the lock file expires, the request including the SPI.

According to some embodiments of the present disclosure, a non-transitory computer-readable storage medium storing a set of instructions is further provided. When executed by one or more processors of an electronic device, the set of instructions causes the electronic device to perform a method. The method includes creating a lock file having a lifecycle for a distributed lock according to a lock file creation request received from a service process of a client. The method also includes writing a unique SPI of the service process into the lock file according to an SPI writing request received from the service process, wherein upon a service process crash is detected, a service replacement process is initiated for allocating the SPI of the crashed service process to the service replacement process. The method further includes acquiring a distributed lock inherit request sent by the service replacement process before the lifecycle of the lock file expires, the request including the SPI. Additionally, the method includes determining whether the SPI of the service replacement process is consistent with the SPI in the lock file, and in response to the SPI of the service replacement process being consistent with the SPI in the lock file, creating a new lock file of the distributed lock for the service replacement process.

According to some embodiments of the present disclosure, a method for acquiring a lock file is further provided. The method includes creating a first service process. An SPI of the first service process is identical to an SPI of a crashed second service process, and the second service process corresponds to a lock file. The method also includes sending, by the first service process, a lock file inherit request that includes the SPI of the first service process.

According to some embodiments of the present disclosure, a method for acquiring a lock file is further provided. The method includes creating a service process that includes an SPI. The method also includes sending, by the service process, a lock file creation request that includes the SPI of the service process.

BRIEF DESCRIPTION OF THE DRAWINGS

Other features, objectives, and advantages of the present disclosure will become more apparent from a reading of the detailed description of the non-limiting embodiments, said description being given in relation to the accompanying drawings.

DETAILED DESCRIPTION

Figure 1:
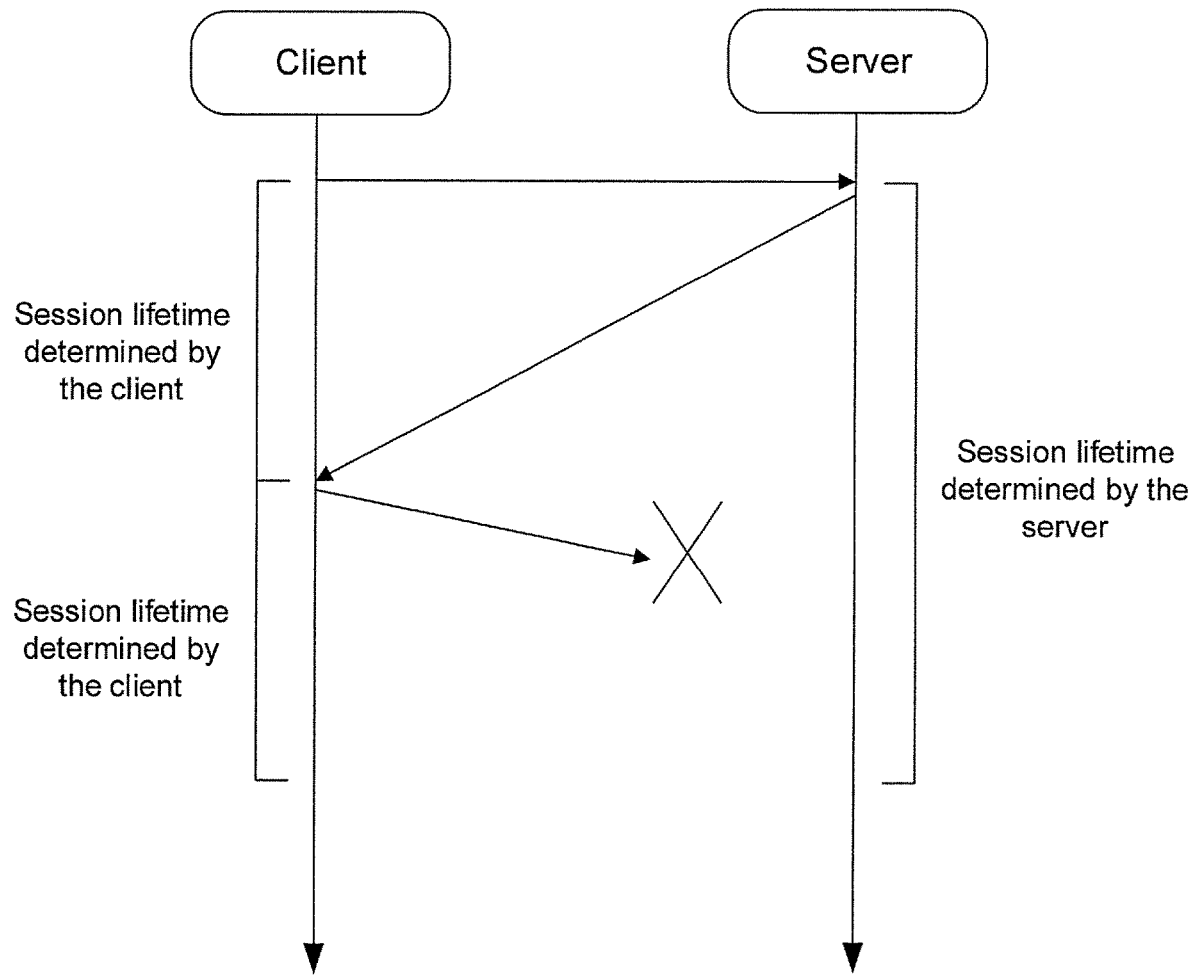
FIG. 1 is a schematic diagram of lifetimes at an existing client and an existing server.
Figure 2:
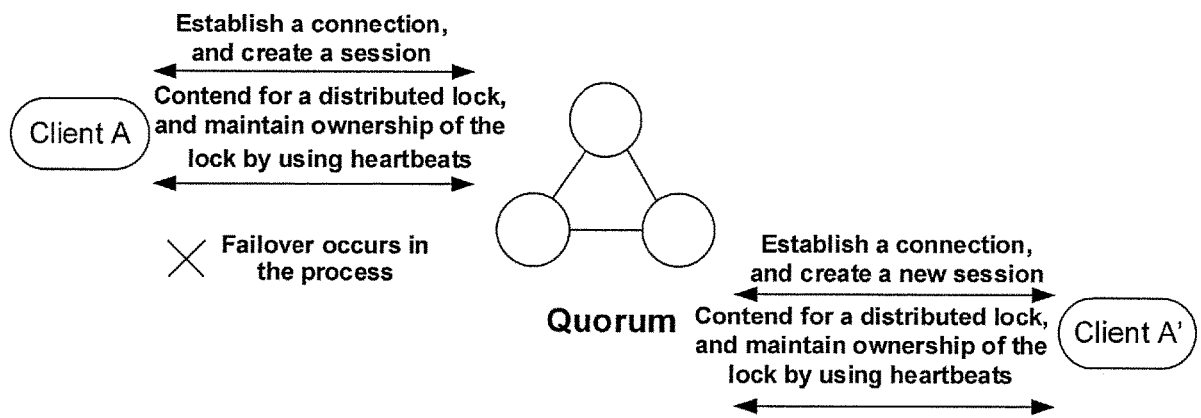
FIG. 2 is a principle diagram of an existing solution in which an application process that owns a distributed lock continues service in a failover scenario.
Figure 3:
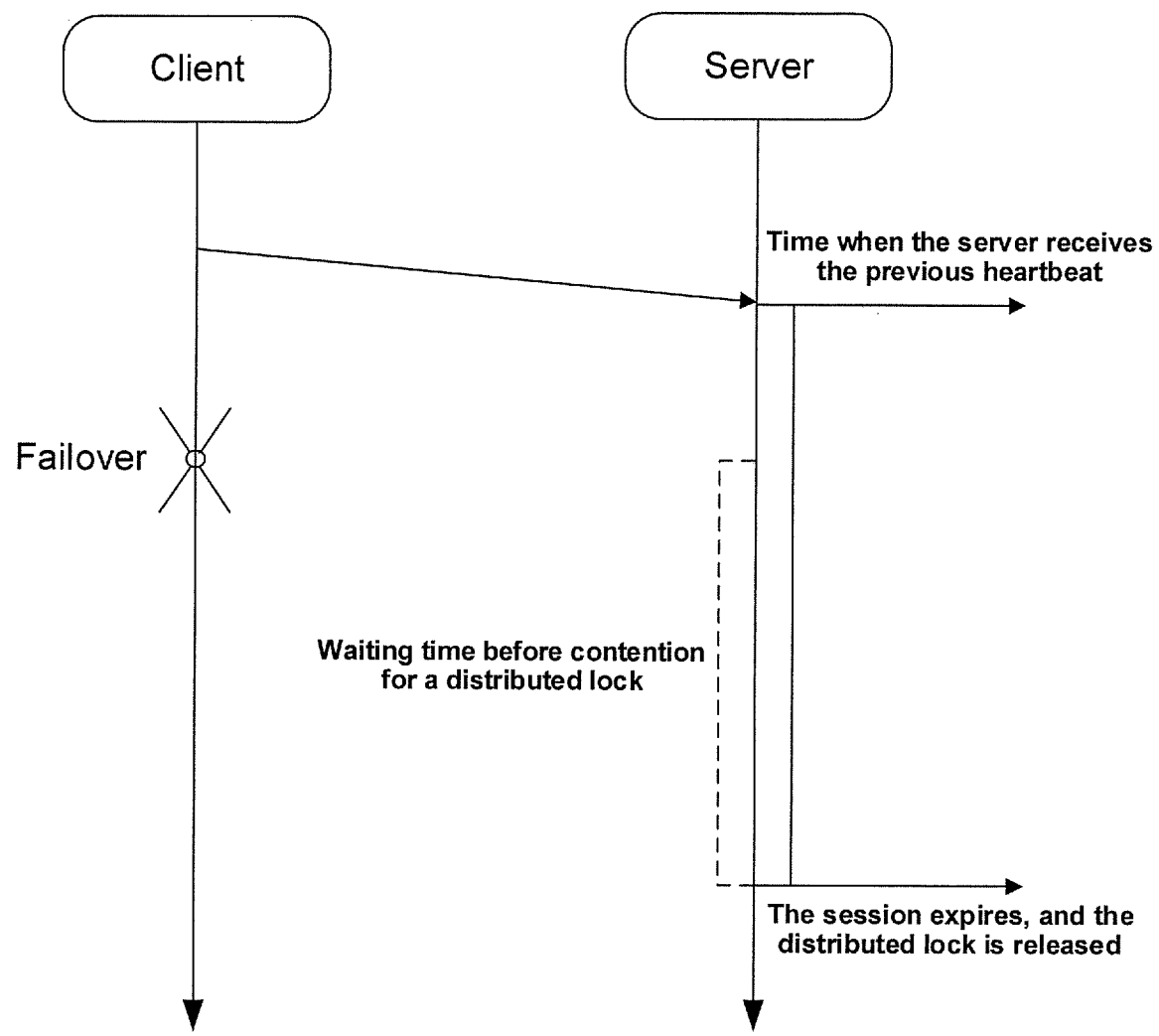
FIG. 3 is a schematic diagram of a waiting time in existing distributed lock contention.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

As used herein, unless specifically stated otherwise, the term "or" encompasses all possible combinations, except where infeasible. For example, if it is stated that a database can include A or B, then, unless specifically stated otherwise or infeasible, the database can include A, or B, or A and B. As a second example, if it is stated that a database can include A, B, or C, then, unless specifically stated otherwise or infeasible, the database can include A, or B, or C, or A and B, or A and C, or B and C, or A and B and C.

In a typical configuration, a terminal, a network serving device, and a trustee each include one or more processors (CPUs), an input/output interface, a network interface, and a memory.

The memory may include a volatile memory, a random access memory (RAM), or a non-volatile memory or the like in a computer readable medium, for example, a read-only memory (ROM) or a flash RAM. The memory is an example of the computer readable medium.

Computer readable media include non-volatile and volatile media as well as removable and non-removable media, and can implement information storage by means of any method or technology. Information may be a computer readable instruction, a data structure, and a module of a program or other data. Examples of computer storage media include but are not limited to, phase change memory (PRAM), static random access memory (SRAM), dynamic random access memory (DRAM), other types of RAMs, ROM, electrically erasable programmable read-only memory (EEPROM), flash memory or other memory technologies, compact disk read-only memory (CD-ROM), digital versatile disc (DVD) or other optical storages, cassette tape, magnetic tape/magnetic disk storage or other magnetic storage devices, or any other non-transmission medium, and can be used to store information accessible to the computing device. According to the definition herein, computer readable media do not include transitory media, such as a modulated data signal and a carrier.

An objective of the present disclosure is to provide an allocation method and device for a distributed lock, which can solve the problem of a service-unavailable time window in the conventional systems. For example, the present disclosure provides an allocation method for a distributed lock at a client. The method includes the following steps.

A client allocates a globally unique Service Process ID (SPI) to a service process. After the service process of the client establishes a connection with a server, the service process requests the server to create a lock file having a lifecycle for a distributed lock. The SPI can be written into the lock file, and specifically, the client can send a request to the server to write the SPI into the lock file. Here, the SPI can be globally unique, and the SPI can refer to different numbers possessed by different service processes running in the same client. Different service processes can be clearly distinguished based on different numbers.

Here, the service process of the client establishes a connection with the server. The connection can be a Transmission Control Protocol (TCP) connection. A session can be created on the connection. Based on the session, the client can request the server to create a lock file for the distributed lock. The lifecycle of the lock file is consistent with a lifecycle of the session at the server. For example, when the lifecycle of the session at the server expires, the quorum server can determine a session as expired after a client determines that the session has expired. The lock file corresponding to the session can also be deleted. In addition, the SPI can be a globally unique SPI corresponding to a distributed application service process. The SPI can be maintained in a daemon process on the client, and when starting the service process, the daemon process can transmit the allocated globally unique SPI to the service process as a start parameter. Here, the daemon process manages all business processes of various services on a client machine. Therefore, the daemon process has the opportunity to allocate a globally unique SPI to each service process and transmit the SPI to the business service process as a start parameter. The daemon process introduces a globally unique SPI for each distributed application service process and uses the SPI to directly manage ownership of the distributed lock. When started by the daemon process, each business service process can acquire its own SPI as a process start parameter and write the SPI into the distributed lock file when succeeding in contention for the lock.

Figures 4, 5:
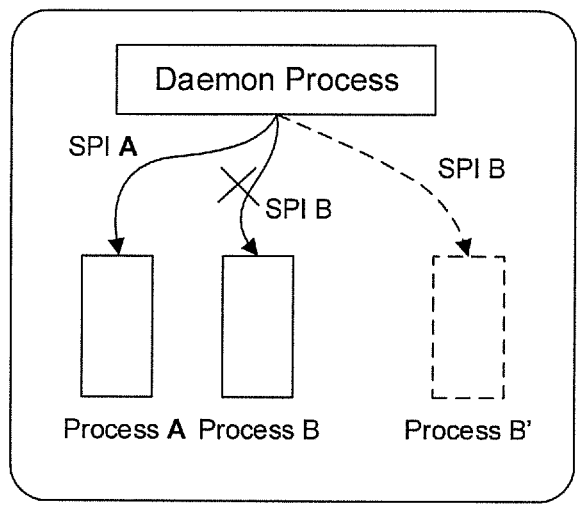
FIG. 4 is a schematic diagram of inheriting an SPI according to some embodiments of the present disclosure.
FIG. 5 is a schematic diagram of an SPI according to some embodiments of the present disclosure.

A new service replacement process can be started upon a service process crash is detected, to replace the crashed service process, and the SPI of the crashed service process is allocated to the service replacement process. Here, when failover occurs in the service process, the daemon process can also transmit the recorded SPI value of the service process as a start parameter to its new inheriting service process, i.e., the service replacement process. In these embodiments, a business service process can be started by using the globally unique SPI managed by the daemon process as the start parameter. Moreover, the original SPI continues to be used in a failover scenario. When the business service process exits abnormally, the daemon process can find and restart the service process. As shown in FIG. 4, the daemon service process manages two business service processes A and B. The daemon process allocates globally unique SPI A and SPI B to business service processes A and B and uses them as process start parameters to awaken business service process A and business service process B, respectively. When business service process B exits abnormally, the daemon process can sense the exit and attempt to restart service process B. The newly started service process is referred to as B'. As an inheritor, service process B' uses the original SPI B as the start parameter. According to the globally unique SPI, service process B' should inherit all rights of the original service process B, including the ownership of the distributed lock occupied by the original service process B. In addition, a service process x and a service replacement process x' are a relative concept. In some embodiments, service replacement process x' can be used to represent a replacer of the original service process x, and service process x can be the one being replaced. In some other embodiments, service process x may become service replacement process x' and correspondingly, service replacement process x' may become service process x.

The service replacement process sends a request for inheriting the ownership of the distributed lock to the server before the lifecycle of the lock file expires, the inherit request including the SPI of the service replacement process. Specifically, as shown in FIG. 1, the expiration of the lifecycle of the lock file refers to expiration of the session lifecycle at the quorum server, and the session lifecycle at the quorum server is at least twice the session lifecycle at the client. In conventional systems, the ownership of the distributed lock is released after the lifecycle of the lock file expires. In the embodiments of the disclosure, however, the service replacement process can send the request for inheriting the ownership of the distributed lock to the server before the lifecycle of the lock file expires, and the server can release the ownership of the distributed lock in advance. As such, the service replacement process can quickly inherit the ownership of the distributed lock to quickly resume the service, without waiting for at least twice the session lifecycle at the client, that is, without waiting for the expiration of the lifecycle of the lock file.

The request for inheriting the ownership of the distributed lock sent to the server can be a conditional update request, to solve the consistency problem caused by concurrent data operations. Determination conditions can be carried when the client sends the request for inheriting the ownership of the distributed lock. When receiving the request for inheriting the ownership of the distributed lock, the server can determine whether the conditions are met one by one. If the conditions are met, data is updated. That is, the service replacement process is allowed to inherit the ownership of the distributed lock. Otherwise, the update is rejected; that is, the service replacement process is not allowed to inherit the ownership of the distributed lock, and an error can be returned to the client. In these embodiments, the following determination condition can be employed: the server determines whether the SPI of the service replacement process is consistent with the current SPI in the lock file. If the SPI of the service replacement process is consistent with the current SPI, the service replacement process is allowed to inherit the ownership of the distributed lock. If the SPI of the service replacement process is not consistent with the current SPI, the service replacement process is not allowed to inherit the ownership of the distributed lock.

The SPI of the service replacement process being inconsistent with the current SPI in the lock file can be one of the following scenarios. For example, an application starts three service processes simultaneously. It is certain that only one of the service processes can succeed in contention for the distributed lock, and the other two service processes find that their own SPIs are inconsistent with the SPI in the content of the lock file. For another example, in the scenario of starting a new service process, if the service process is started so slowly that the backend lock file is actively released by the server, another service process succeeds in contention for the lock, and the SPI value of the another service process is written into the content of the lock file, the newly started service process fails in contention for the lock.

In the above embodiments, a globally unique SPI is introduced for each distributed application service process while guaranteeing the correctness of the distributed lock, and the SPI is used to directly manage the ownership of the distributed lock. The service replacement process sends the request for inheriting the ownership of the distributed lock to the server before the lifecycle of the lock file expires, the inherit request including the SPI of the service replacement process. Therefore, that the service replacement process can actively and quickly inherit the ownership of the original distributed lock in a zero wait-state can be supported in a service process failover scenario, avoiding the problem of a service-unavailable time window in the conventional systems. In a failover scenario, when the newly started service replacement process contends for the distributed lock, the server can compare the SPI of the service replacement process with an owner's SPI recorded in the distributed lock file, to determine whether the service process replaced by the service replacement process initiating the request originally occupied the same distributed lock. If the service process replaced by the service replacement process initiating the request originally occupied the same distributed lock, it is considered that the service replacement process originally occupies the distributed lock. Therefore, the distributed lock file is deleted to guarantee that the ownership of the distributed lock can be released actively and correctly, thus supporting direct contention for the distribution lock in a zero wait-state, and significantly improving the continuity of the business service in a failover scenario.

Specifically, a mechanism for generating the globally unique SPI of the business service process is as shown in FIG. 5. The SPI includes two parts: a client hostname used for distinguishing business service processes on different machines, and a locally unique ID of the service process, which can be a current timestamp, a UUID value, or the like. The locally unique ID is used for guaranteeing that business SPIs are not repeated in every client. The specific implementation relies on a management mechanism of the daemon process in an actual business scenario. For example, a container ID in a mainstream Docker container technology is an appropriate SPI value that can uniquely identify a service process in the Docker container. As described above, once a process SPI is allocated in the daemon process, there is a service process corresponding to the process SPI. Even if it is detected that the current service process crashes, the daemon process can soon start a new service process which inherits the original SPI.

In some embodiments of the allocation method for a distributed lock at a client according to the present disclosure, additional processing can be included in the step of the service replacement process sending a request for inheriting the ownership of the distributed lock to the server before the lifecycle of the lock file expires, the inherit request including the SPI of the service replacement process. For example, the step can include the service replacement process sending a request to the server for attempting to create a new lock file for the same distributed lock. The step can further include, if the server feeds back a creation attempt failure, the service replacement process sending a request for inheriting the ownership of the distributed lock to the server before the lifecycle expires, the inherit request including the SPI of the service replacement process.

To provide a correct distributed lock, the client and the server understand the expiration time of the same distributed lock differently. As indicated above, the expiration time assumed by the server should be at least twice the expiration time assumed by the client. In other words, upon detecting that the client process crashes suddenly, the server does not consider that the distributed lock has expired. In the worst-case scenario, the immediately rebooted client process waits for the whole expiration time of the server before succeeding in lock contention. Of course, if it takes a long time for the daemon process to restart the crashed client process, and the server considers that the distributed lock expires and deletes the lock file, i.e., releases the distributed lock, during this long period of time, the newly started client process can immediately succeed in lock contention. Therefore, in these embodiments of the present disclosure, the client can first send a request to the server for attempting to create a new lock file for the same distributed lock. However, the probability of successfully creating a new lock file is very low. If the server feeds back a creation attempt failure, the request for inheriting the ownership of the distributed lock that the service replacement process sends to the server before the lifecycle of the lock file expires can be a conditional update request, to solve the consistency problem caused by concurrent data operations. Determination conditions can be carried when the client sends the request for inheriting the ownership of the distributed lock. When receiving the request for inheriting the ownership of the distributed lock, the server can determine whether the conditions are met one by one. If the conditions are met, data is updated. That is, the service replacement process is allowed to inherit the ownership of the distributed lock. Otherwise, the update is rejected; that is, the service replacement process is not allowed to inherit the ownership of the distributed lock, and an error can be returned to the client. In these embodiments, the following determination condition can be employed: the server determines whether the SPI of the service replacement process is consistent with the current SPI in the lock file, and if the SPI of the service replacement process is consistent with the current SPI, the service replacement process is allowed to inherit the ownership of the distributed lock; if the SPI of the service replacement process is not consistent with the current SPI, the service replacement process is not allowed to inherit the ownership of the distributed lock.

In some embodiments of the allocation method for a distributed lock at a client according to the present disclosure, the step of the service replacement process sending a request for inheriting the ownership of the distributed lock to the server before the lifecycle of the lock file expires can include additional processing. For example, the step can include the service replacement process sending a request for deleting the lock file created by the service process to the server before the lifecycle of the lock file expires, the deletion request including the SPI of the service replacement process. The step can further include the service replacement process sending a request for creating a new lock file for the same distributed lock to the server.

Specifically, in these embodiments, the inherit request can include the deletion request and the subsequent creation request. The deletion request can include the SPI of the service replacement process. The request for deleting the lock file created by the service process that the service replacement process sends to the server before the lifecycle of the lock file expires can be a conditional update request, to solve the consistency problem caused by concurrent data operations. Determination conditions can be carried when the client sends the request for deleting the lock file created by the service process. When receiving the request for deleting the lock file created by the service process, the server can determine whether the conditions are met one by one. If the conditions are met, data is updated. That is, the server agrees to delete the lock file created by the service process. Otherwise, the update is rejected; that is, the server does not agree to delete the lock file created by the service process, and can return an error to the client. In these embodiments, the following determination condition can be employed: the server determines whether the SPI of the service replacement process is consistent with the current SPI in the lock file, and if the SPI of the service replacement process is consistent with the current SPI, the server agrees to delete the lock file created by the service process, and then the client can continue to send a creation request for the same distributed lock based on deletion success feedback received from the server; if the SPI of the service replacement process is not consistent with the current SPI, the server does not agree to delete the lock file created by the service process.

In some embodiments of the allocation method for a distributed lock at a client according to the present disclosure, additional processing can be included in the step of the service replacement process sending a request for deleting the lock file created by the service process to the server before the lifecycle of the lock file expires, and sending a request for creating a new lock file for the same distributed lock to the server, wherein the deletion request includes the SPI of the service replacement process. For example, the method can include sending a request for acquiring a transaction ID to the server, so as to acquire the transaction ID generated during creation of the lock file from the lock file of the server, wherein the server records the transaction ID generated during creation of each lock file. The method can further include the service replacement process sending a request for deleting the lock file created by the service process to the server before the lifecycle expires, the deletion request further including the transaction ID generated during creation of the lock file, wherein specifically, a globally unique transaction ID is allocated to each corresponding data update request in the distributed consensus system, the transaction IDs are sequential, and a larger value denotes that the transaction request is initiated later. In addition, the method can include receiving feedback about whether deletion of the lock file is successful from the server, wherein the server feeds back whether the lock file is deleted successfully based on whether the transaction ID in the deletion request is consistent with the transaction ID generated during creation in the current lock file for the distributed lock of the server. Furthermore, the method can include sending a request for creating a new lock file for the same distributed lock to the server based on the deletion success feedback received from the server, if the deletion succeeds.

Here, the inherit request can include the deletion request and the subsequent creation request. The deletion request can include the SPI of the service replacement process. The request for deleting the lock file created by the service process that the service replacement process sends to the server before the lifecycle of the lock file expires can be a conditional update request, to solve the consistency problem caused by concurrent data operations. Determination conditions can be carried when the client sends the request for deleting the lock file created by the service process. When receiving the request for deleting the lock file created by the service process, the server can determine whether the conditions are met one by one. If the conditions are met, data is updated. That is, the server agrees to delete the lock file created by the service process. Otherwise, the update is rejected; that is, the server does not agree to delete the lock file created by the service process and can return an error to the client. In these embodiments, the following determination conditions can be employed: the server determines whether the SPI of the service replacement process is consistent with the current SPI in the lock file and determines whether the transaction ID in the request is consistent with the transaction ID generated during creation in the current lock file for the distributed lock of the server. If both the SPIs and the transaction IDs are consistent, the server agrees to delete the lock file created by the service process. Then, the client can continue to send a request to the server for creating a new lock file for the same distributed lock based on deletion success feedback received from the server. If the SPIs are inconsistent or the transaction IDs are inconsistent, the server does not agree to delete the lock file created by the service process.

These embodiments can delete the distributed lock file based on a comparison of transaction IDs and can release the ownership of the distributed lock actively and correctly, avoiding having a request packet for deleting a lock file float over the network and a valid distributed lock occupied by another process ultimately being deleted by mistake. For example, a service process 8 originally owns a distributed lock file A. Process 8 can actively release the ownership, that is, the distributed lock file A can be deleted by service process 8. However, the distributed lock file A can also be deleted automatically by the server after the server determines that the distributed lock file A expires. As such, process 9 has the opportunity to own the lock. For example, the transaction ID generated when the newly started service process 8 creates the lock file A is 1000, and the transaction ID carried in the deletion request is 1000. However, as it is detected that the newly started process 8 crashes again when the deletion request arrives at the server, the lock file A has been re-created by the newly started service process 9, and at this point, the transaction ID is 2000. The transaction ID 1000 carried in the deletion request is inconsistent with the latest transaction ID 2000 of the current lock file. As a result, service process 8 is not the owner of the current lock file A and does not have the right to delete the lock file A. Therefore, the deletion request from service process 8 needs to be ignored. It should be noted here that, although the distributed lock A can be deleted automatically by the server, it takes a long time. Service process 8 can safely and actively delete the lock file in a timely manner before the end of the lifecycle only by introducing the mechanism of the present disclosure. If it is determined based on the transaction ID that service process 8 has lost the ownership of the distributed lock file A, the server will not accept the deletion request from service process 8.

In some embodiments of the allocation method for a distributed lock at a client according to the present disclosure, after the step of receiving feedback about whether deletion of the lock file is successful from the server, the method further includes receiving from the server feedback indicating that the service replacement process fails in contention for the lock file, if the deletion fails.

Here, if the server compares the transaction ID in the deletion request with the transaction ID generated during creation in the current lock file for the distributed lock of the server and finds them inconsistent, the server can determine that the service replacement process is not an inheritor of the original service process, and can send feedback indicating that the service replacement process fails in contention for the lock file to the client. These embodiments can delete the distributed lock file based on a comparison of transaction IDs, and release the ownership of the distributed lock actively and correctly, thus avoiding having a request packet for deleting a lock file float over the network and a valid distributed lock occupied by another process ultimately being deleted by mistake.

In some embodiments of the allocation method for a distributed lock at a client according to the present disclosure, after the step of the service replacement process sending a request to the server for attempting to create a new lock file having a lifecycle for the same distributed lock before the lifecycle of the lock file expires, the method can further includes acquiring from the server feedback indicating that the service replacement process succeeds in contention for the distributed lock, if the server succeeds in the creation attempt.

To provide a correct distributed lock, the client and the server understand the expiration time of the same distributed lock differently. As indicated above, the expiration time assumed by the server should be at least twice the expiration time assumed by the client. In other words, upon detecting that the client process crashes suddenly, the server does not consider that the distributed lock has expired. In the worst-case scenario, the immediately rebooted client process waits for the whole expiration time of the server before succeeding in lock contention. Of course if it takes a long time for the daemon process to restart the crashed client process, and the server considers that the distributed lock expires and deletes the lock file, i.e., releases the distributed lock, during this long period of time, the newly started client process can immediately succeed in lock contention. Therefore, in these embodiments, the client can first send a request to the server for attempting to create a new lock file for the same distributed lock. If the server succeeds in the creation attempt, feedback indicating that the service replacement process succeeds in contention for the distributed lock can be acquired from the server.

The present disclosure further provides an allocation method for a distributed lock at a server. The method includes the following steps.

A lock file having a lifecycle for a corresponding distributed lock is created according to a lock file creation request received from a service process of a client.

The unique SPI of the service process is written into the lock file according to an SPI writing request received from the service process, wherein the client starts a new service replacement process upon a service process crash is detected, to replace the crashed service process, and allocates the SPI of the crashed service process to the service replacement process. Here, the service process of the client establishes a connection with the server. A session is created on the connection. Based on the session, the client requests the server to create a lock file for the distributed lock. The lifecycle of the lock file is consistent with a lifecycle of the session at the server. That is, when the lifecycle of the session at the server expires, the lock file corresponding to the session can also be deleted. In addition, the SPI can be a globally unique SPI corresponding to a distributed application service process. The SPI can be maintained in a daemon process on the client. When starting the service process, the daemon process can transmit the allocated globally unique SPI to the service process as a start parameter. Here, the daemon process manages all business processes of various services on a client machine. Therefore, the daemon process has the opportunity to allocate a globally unique SPI to each service process, and transmit the SPI to the business service process as a start parameter. The daemon process introduces a globally unique SPI for each distributed application service process, and uses the SPI to directly manage ownership of the distributed lock. When being started by the daemon process, each business service process can acquire its own SPI serving as a process start parameter, and write the SPI into the distributed lock file when succeeding in contention for the lock. When failover occurs in the service process, the daemon process can also transmit the recorded SPI value of the service process as a start parameter to the new inheriting service process, i.e., the service replacement process. In these embodiments, a business service process can be started by using the globally unique SPI managed by the daemon process as the start parameter. Moreover, the original SPI continues to be used in a failover scenario. When the business service process exits abnormally, the daemon process can find and restart the service process.

As shown in FIG. 4, the daemon service process manages two business service processes A and B. The daemon process allocates globally unique SPI A and SPI B to business service processes A and B and uses them as process start parameters to awaken business service process A and business service process B, respectively. When business service process B exits abnormally, the daemon process can sense the exit and attempt to restart service process B. The newly started service process is referred to as B'. As an inheritor, service process B' uses the original SPI B as the start parameter. According to the globally unique SPI, service process B' should inherit all rights of the original service process B, including the ownership of the distributed lock occupied by the original service process B.

The distributed lock inherit request sent by the service replacement process before the lifecycle of the lock file expires is acquired, the inherit request including the SPI of the service replacement process. It is determined whether the SPI of the service replacement process is consistent with the current SPI in the lock file, and if the SPI of the service replacement process is consistent with the current SPI, a new lock file for the same distributed lock is created for the service replacement process. Specifically, the request for inheriting the ownership of the distributed lock that the service replacement process sends to the server before the lifecycle of the lock file expires can be a conditional update request, to solve the consistency problem caused by concurrent data operations. Determination conditions can be carried when the client sends the request for inheriting the ownership of the distributed lock. When receiving the request for inheriting the ownership of the distributed lock, the server can determine whether the conditions are met one by one. If the conditions are met, data is updated. That is, the service replacement process is allowed to inherit the ownership of the distributed lock. Otherwise, the update is rejected; that is, the service replacement process is not allowed to inherit the ownership of the distributed lock, and an error can be returned to the client. In these embodiments, the following determination condition can be employed: the server determines whether the SPI of the service replacement process is consistent with the current SPI in the lock file, and if the SPI of the service replacement process is consistent with the current SPI, the service replacement process is allowed to inherit the ownership of the distributed lock; if the SPI of the service replacement process is not consistent with the current SPI, the service replacement process is not allowed to inherit the ownership of the distributed lock. The SPI of the service replacement process being inconsistent with the current SPI in the lock file can be one of the following scenarios.

For example, an application starts three service processes simultaneously. It is certain that only one of the service processes can succeed in contention for the distributed lock, and the other two service processes find that their own SPIs are inconsistent with the SPI in the content of the lock file.

For another example, in the scenario of starting a new service process, if the service process is started so slowly that the backend lock file is actively released by the server, another service process succeeds in contention for the lock, and an SPI value of the another service process is written into the content of the lock file, the newly started service process fails in contention for the lock.

In the above embodiments, a globally unique SPI is introduced for each distributed application service process while guaranteeing the correctness of the distributed lock, and the SPI is used to directly manage the ownership of the distributed lock. The service replacement process sends the request for inheriting the ownership of the distributed lock to the server before the lifecycle of the lock file expires, the inherit request including the SPI of the service replacement process. Therefore, that the service replacement process can actively and quickly inherit the ownership of the original distributed lock in a zero wait-state can be supported in a service process failover scenario, avoiding the problem of a service-unavailable time window in the conventional systems. In a failover scenario, when the newly started service replacement process contends for the distributed lock, the server can compare the SPI of the service replacement process with an owner's SPI recorded in the distributed lock file, to determine whether the service process replaced by the service replacement process initiating the request originally occupied the same distributed lock. If the service process replaced by the service replacement process initiating the request originally occupied the same distributed lock, it is considered that the service replacement process originally occupies the distributed lock. Therefore, the distributed lock file is deleted to guarantee that the ownership of the distributed lock can be released actively and correctly, thus supporting direct contention for the distribution lock in a zero wait-state, and significantly improving the continuity of the business service in a failover scenario.

Specifically, a mechanism for generating the globally unique SPI of the business service process is as shown in FIG. 5. The SPI includes two parts: a client hostname used for distinguishing business service processes on different machines, and a locally unique ID of the service process, which can be a current timestamp, a UUID value, or the like. The locally unique ID is used for guaranteeing that business SPIs are not repeated in every client. The specific implementation relies on a management mechanism of the daemon process in an actual business scenario. For example, a container ID in a mainstream Docker container technology is an appropriate SPI value that can uniquely identify a service process in the Docker container. As described above, once a process SPI is allocated in the daemon process to correspond to a service process, even if it is detected that the current service process crashes, the daemon process can soon start a new service process which inherits the original SPI.

In some embodiments of the allocation method for a distributed lock at a server according to the present disclosure, additional processing can be included in the step of acquiring the distributed lock inherit request sent by the service replacement process before the lifecycle of the lock file expires, the inherit request including the SPI of the service replacement process, determining whether the SPI of the service replacement process is consistent with the current SPI in the lock file, and if the SPI of the service replacement process is consistent with the current SPI, creating a new lock file of the same distributed lock for the service replacement process. For example, the method can include attempting to create a new lock file of the same distributed lock for the service replacement process according to a re-creation attempt request received from the service replacement process, and feeding back a creation attempt failure to the service replacement process if the attempt fails. The method can further include acquiring the distributed lock inherit request sent by the service replacement process before the lifecycle of the lock file expires, the inherit request including the SPI of the service replacement process; determining whether the SPI of the service replacement process is consistent with the current SPI in the lock file; and if the SPI of the service replacement process is consistent with the current SPI, creating a new lock file of the same distributed lock for the service replacement process.

To provide a correct distributed lock, the client and the server understand the expiration time of the same distributed lock differently. As indicated above, the expiration time assumed by the server should be at least twice the expiration time assumed by the client. In other words, upon detecting that the client process crashes suddenly, the server does not consider that the distributed lock has expired. In the worst-case scenario, the immediately rebooted client process waits for the whole expiration time of the server before succeeding in lock contention. Of course, if it takes a long time for the daemon process to restart the crashed client process, and the server considers that the distributed lock expires and deletes the lock file, i.e., releases the distributed lock, during this long period of time, the newly started client process can immediately succeed in lock contention. Therefore, in these embodiments, the client can first send a request to the server for attempting to create a new lock file for the same distributed lock. However, the probability of successfully creating a new lock file is very low. If the server feeds back a creation attempt failure, the request for inheriting the ownership of the distributed lock that the service replacement process sends to the server before the lifecycle of the lock file expires can be a conditional update request, to solve the consistency problem caused by concurrent data operations. Determination conditions can be carried when the client sends the request for inheriting the ownership of the distributed lock. When receiving the request for inheriting the ownership of the distributed lock, the server can determine whether the conditions are met one by one. If the conditions are met, data is updated. That is, the service replacement process is allowed to inherit the ownership of the distributed lock. Otherwise, the update is rejected; that is, the service replacement process is not allowed to inherit the ownership of the distributed lock, and an error can be returned to the client. In these embodiments, the following determination condition can be employed: the server determines whether the SPI of the service replacement process is consistent with the current SPI in the lock file, and if the SPI of the service replacement process is consistent with the current SPI, the service replacement process is allowed to inherit the ownership of the distributed lock; if the SPI of the service replacement process is not consistent with the current SPI, the service replacement process is not allowed to inherit the ownership of the distributed lock.

In some embodiments of the allocation method for a distributed lock at a server according to the present disclosure, additional processing can be included in the step of acquiring the distributed lock inherit request sent by the service replacement process before the lifecycle of the lock file expires, determining whether the SPI of the service replacement process is consistent with the current SPI in the lock file, and if the SPI of the service replacement process is consistent with the current SPI, creating a new lock file of the same distributed lock for the service replacement process. For example, the method can include: receiving a lock file deletion request sent by the service replacement process before the lifecycle of the lock file expires, the lock file deletion request including the SPI of the service replacement process; determining whether the SPI of the service replacement process is consistent with the current SPI in the lock file according to the lock file deletion request; and if the SPI of the service replacement process is consistent with the current SPI, deleting the lock file created by the service process. The method can further include creating a new lock file of the same distributed lock for the replacement process according to the creation request received from the service replacement process.

Here, in these embodiments, the inherit request can include the deletion request and the subsequent creation request. The deletion request can include the SPI of the service replacement process. The request for deleting the lock file created by the service process that the service replacement process sends to the server before the lifecycle of the lock file expires can be a conditional update request, to solve the consistency problem caused by concurrent data operations. Determination conditions can be carried when the client sends the request for deleting the lock file created by the service process. When receiving the request for deleting the lock file created by the service process, the server can determine whether the conditions are met one by one. If the conditions are met, data is updated. That is, the server agrees to delete the lock file created by the service process. Otherwise, the update is rejected; that is, the server does not agree to delete the lock file created by the service process, and can return an error to the client. In these embodiments, the following determination condition can be employed: the server determines whether the SPI of the service replacement process is consistent with the current SPI in the lock file, and if the SPI of the service replacement process is consistent with the current SPI, the server agrees to delete the lock file created by the service process, and then the client can continue to send a creation request for the same distributed lock based on deletion success feedback received from the server; if the SPI of the service replacement process is not consistent with the current SPI, the server does not agree to delete the lock file created by the service process.

In some embodiments of the allocation method for a distributed lock at a server according to the present disclosure, after the step of creating a lock file having a lifecycle for a corresponding distributed lock, the method can further include additional processing. For example, the method can include writing into the lock file the transaction ID generated during creation of the lock file. The method can also include the step of receiving a lock file deletion request sent by the service replacement process before the lifecycle of the lock file expires, the file lock deletion request including the SPI of the service replacement process. The method can include sending the transaction ID generated during creation of the lock file to the client according to a transaction ID acquisition request received from the client, and receiving the lock file deletion request sent by the service replacement process before the lifecycle of the lock file expires, the file lock deletion request including the SPI of the service replacement process and the transaction ID generated during creation of the lock file. The method can further include the step of deleting the lock file created by the service process. The method can include determining whether the transaction ID in the lock file deletion request is consistent with the transaction ID generated during creation in the current lock file for the distributed lock of the server, wherein the transaction ID generated during creation of the current lock file can be written in the corresponding current lock file in the server. The method can further include, if the transaction ID in the lock file deletion request is consistent with the transaction ID generated during creation in the current lock file for the distributed lock of the server, deleting the lock file created by the service process, feeding back a deletion success to the service replacement process, and acquiring a request for creating a new lock file for the same distributed lock sent by the service replacement process.

Specifically, a globally unique transaction ID is allocated correspondingly to each data update request in the distributed consensus system. The transaction IDs are sequential, and a larger value denotes that the transaction request is initiated later. Here, the inherit request can include the deletion request and the subsequent creation request. The deletion request can include the SPI of the service replacement process. The request for deleting the lock file created by the service process that the service replacement process sends to the server before the lifecycle of the lock file expires can be a conditional update request, to solve the consistency problem caused by concurrent data operations. Determination conditions can be carried when the client sends the request for deleting the lock file created by the service process. When receiving the request for deleting the lock file created by the service process, the server can determine whether the conditions are met one by one. If the conditions are met, data is updated. That is, the server agrees to delete the lock file created by the service process. Otherwise, the update is rejected; that is, the server does not agree to delete the lock file created by the service process, and can return an error to the client. In these embodiments, the following determination conditions can be employed: the server determines whether the SPI of the service replacement process is consistent with the current SPI in the lock file and determines whether the transaction ID in the request is consistent with the transaction ID generated during creation in the current lock file for the distributed lock of the server. If both the SPIs and the transaction IDs are consistent, the server agrees to delete the lock file created by the service process. Then, the client can continue to send a request for creating a new lock file for the same distributed lock to the server based on deletion success feedback received from the server. If the SPIs are inconsistent or the transaction IDs are inconsistent, the server does not agree to delete the lock file created by the service process. These embodiments can delete the distributed lock file based on a comparison of transaction IDs, and can release the ownership of the distributed lock actively and correctly, avoiding having a request packet for deleting a lock file float over the network and a valid distributed lock occupied by another process ultimately being deleted by mistake.

For example, service process 8 originally owns a distributed lock file A. Process 8 can actively release the ownership, that is, the distributed lock file A can be deleted by service process 8. However, the distributed lock file A can also be deleted automatically by the server after the server determines that the distributed lock file A expires. As such, process 9 has the opportunity to own the lock. For example, the transaction ID generated when the newly started service process 8 creates the lock file A is 1000, and the transaction ID carried in the deletion request is 1000. However, as it is detected that the newly started process 8 crashes again when the deletion request arrives at the server, the lock file A has been re-created by the newly started service process 9, and at this point, the transaction ID is 2000. The transaction ID 1000 carried in the deletion request is inconsistent with the latest transaction ID 2000 of the current lock file. As a result, service process 8 is not the owner of the current lock file A and does not have the right to delete the lock file A. Therefore, the deletion request from service process 8 needs to be ignored. It should be noted here that, although the distributed lock A can be deleted automatically by the server, it takes a long time. Service process 8 can safely and actively delete the lock file in a timely manner before the end of the lifecycle only by introducing the mechanism of the present disclosure. If it is determined based on the transaction ID that service process 8 has lost the ownership of the distributed lock file A, the server will not accept the deletion request from service process 8.

In some embodiments of the allocation method for a distributed lock at a server according to the present disclosure, after the step of feeding back whether the lock file is deleted successfully to the service replacement process, the method can further include feeding back a lock file contention failure to the service replacement process if the deletion fails.

Here, if the server compares the transaction ID in the deletion request with the transaction ID generated during creation in the current lock file for the distributed lock of the server and finds them inconsistent, the server can determine that the service replacement process is not an inheritor of the original service process, and can send feedback indicating that the service replacement process fails in contention for the lock file to the client. These embodiments can delete the distributed lock file based on a comparison of transaction IDs, and release the ownership of the distributed lock actively and correctly, thus avoiding having a request packet for deleting a lock file float over the network and a valid distributed lock occupied by another process ultimately being deleted by mistake.

In some embodiments of the allocation method for a distributed lock at a server according to the present disclosure, after the step of attempting to create a new lock file of the same distributed lock for the service replacement process, the method can further include additional processing. For example, the method can include feeding back a distributed lock contention success to the service replacement process if the creation attempt succeeds.

To provide a correct distributed lock, the client and the server understand the expiration time of the same distributed lock differently. As indicated above, the expiration time assumed by the server should be at least twice the expiration time assumed by the client. In other words, upon detecting that the client process crashes suddenly, the server does not consider that the distributed lock has expired. In the worst-case scenario, the immediately rebooted client process waits for the whole expiration time of the server before succeeding in lock contention. Of course, if it takes a long time for the daemon process to restart the crashed client process, and the server considers that the distributed lock expires and deletes the lock file, i.e., releases the distributed lock, during this long period of time, the newly started client process can immediately succeed in lock contention. Therefore, in these embodiments, the client can first send a request to the server for attempting to create a new lock file for the same distributed lock. If the server succeeds in the creation attempt, feedback indicating that the service replacement process succeeds in contention for the distributed lock can be acquired from the server.

The present disclosure further provides a client, including a creation request apparatus, a failover apparatus, and an inherit request apparatus.

The creation request apparatus is configured to allocate a unique SPI to a service process, such that after requesting a server to create a lock file having a lifecycle for a distributed lock, the service process sends a request to the server to write the SPI into the lock file.

Here, the globally unique SPI can refer to different numbers possessed by different service processes running in the client. Different service processes can be clearly distinguished based on different numbers.

The service process of the client establishes a connection with the server. The connection can be a TCP connection. A session can be created on the connection. Based on the session, the client can request the server to create a lock file for the distributed lock. The lifecycle of the lock file is consistent with a lifecycle of the session at the server. For example, when the lifecycle of the session at the server expires, the quorum server can determine a session as expired after a client determines that the session has expired. The lock file corresponding to the session can also be deleted. In addition, the SPI can be a globally unique SPI corresponding to a distributed application service process. The SPI can be maintained in a daemon process on the client, and when starting the service process, the daemon process can transmit the allocated globally unique SPI to the service process as a start parameter. Here, the daemon process manages all business processes of various services on a client machine. Therefore, the daemon process has the opportunity to allocate a globally unique SPI to each service process, and transmit the SPI to the business service process as a start parameter. The daemon process introduces a globally unique SPI for each distributed application service process, and uses the SPI to directly manage ownership of the distributed lock. When being started by the daemon process, each business service process can acquire its own SPI as a process start parameter, and write the SPI into the distributed lock file when succeeding in contention for the lock.

The failover apparatus is configured to start a new service replacement process upon a service process crash is detected, to replace the crashed service process, and allocate the SPI of the crashed service process to the service replacement process. Here, when failover occurs in the service process, the daemon process can also transmit the recorded SPI value of the service process as a start parameter to its new inheriting service process, i.e., the service replacement process. In these embodiments, a business service process can be started by using the globally unique SPI managed by the daemon process as the start parameter. Moreover, the original SPI continues to be used in a failover scenario. When the business service process exits abnormally, the daemon process can find and restart the service process. As shown in FIG. 4, the daemon service process manages two business service processes A and B. The daemon process allocates the globally unique SPI A and SPI B to business service processes A and B and uses them as process start parameters to awaken business service process A and business service process B, respectively. When business service process B exits abnormally, the daemon process can sense the exit and attempt to restart service process B. The newly started service process is referred to as B'. As an inheritor, service process B' uses the original SPI B as the start parameter. According to the globally unique SPI, service process B' should inherit all rights of the original service process B, including the ownership of the distributed lock occupied by the original service process B.

The inherit request apparatus is configured to enable the service replacement process to send a request for inheriting the ownership of the distributed lock to the server before the lifecycle of the lock file expires, the inherit request including the SPI of the service replacement process. Specifically, as shown in FIG. 1, the expiration of the lifecycle of the lock file refers to expiration of the session lifecycle at the quorum server, and the session lifecycle at the quorum server is at least twice the session lifecycle at the client. In the conventional systems, the ownership of the distributed lock is released after the lifecycle of the lock file expires. In these embodiments, the service replacement process can send the request for inheriting the ownership of the distributed lock to the server before the lifecycle of the lock file expires, and the server can release the ownership of the distributed lock in advance. As such, the service replacement process can quickly inherit the ownership of the distributed lock to quickly resume the service, without waiting for at least twice the session lifecycle at the client, that is, without waiting for the expiration of the lifecycle of the lock file.

The request for inheriting the ownership of the distributed lock sent to the server can be a conditional update request, to solve the consistency problem caused by concurrent data operations. Determination conditions can be carried when the client sends the request for inheriting the ownership of the distributed lock. When receiving the request for inheriting the ownership of the distributed lock, the server can determine whether the conditions are met one by one. If the conditions are met, data is updated. That is, the service replacement process is allowed to inherit the ownership of the distributed lock. Otherwise, the update is rejected; that is, the service replacement process is not allowed to inherit the ownership of the distributed lock, and an error can be returned to the client. In these embodiments, the following determination condition can be employed: the server determines whether the SPI of the service replacement process is consistent with the current SPI in the lock file, and if the SPI of the service replacement process is consistent with the current SPI, the service replacement process is allowed to inherit the ownership of the distributed lock; if the SPI of the service replacement process is not consistent with the current SPI, the service replacement process is not allowed to inherit the ownership of the distributed lock. The SPI of the service replacement process being inconsistent with the current SPI in the lock file can be one of the following scenarios.

For example, an application starts three service processes simultaneously. It is certain that only one of the service processes can succeed in contention for the distributed lock, and the other two service processes find that their own SPIs are inconsistent with the SPI in the content of the lock file.

For another example, in the scenario of starting a new service process, if the service process is started so slowly that the backend lock file is actively released by the server, another service process succeeds in contention for the lock, and an SPI value of the another service process is written into the content of the lock file, the newly started service process fails in contention for the lock.

In the above embodiments, a globally unique SPI is introduced for each distributed application service process while guaranteeing the correctness of the distributed lock, and the SPI is used to directly manage the ownership of the distributed lock. The service replacement process sends the request for inheriting the ownership of the distributed lock to the server before the lifecycle of the lock file expires, the inherit request including the SPI of the service replacement process. Therefore, that the service replacement process can actively and quickly inherit the ownership of the original distributed lock in a zero wait-state can be supported in a service process failover scenario, avoiding the problem of a service-unavailable time window in the conventional systems. In a failover scenario, when the newly started service replacement process contends for the distributed lock, the server can compare the SPI of the service replacement process with an owner's SPI recorded in the distributed lock file, to determine whether the service process replaced by the service replacement process initiating the request originally occupied the same distributed lock. If the service process replaced by the service replacement process initiating the request originally occupied the same distributed lock, it is considered that the service replacement process originally occupies the distributed lock. Therefore, the distributed lock file is deleted to guarantee that the ownership of the distributed lock can be released actively and correctly, thus supporting direct contention for the distribution lock in a zero wait-state, and significantly improving the continuity of the business service in a failover scenario.

Specifically, a mechanism for generating the globally unique SPI of the business service process is as shown in FIG. 5. The SPI includes two parts: a client hostname used for distinguishing business service processes on different machines, and a locally unique ID of the service process, which can be a current timestamp, a UUID value, or the like. The locally unique ID is used for guaranteeing that business SPIs are not repeated in every client. The specific implementation relies on a management mechanism of the daemon process in an actual business scenario. For example, a container ID in a mainstream Docker container technology is an appropriate SPI value that can uniquely identify a service process in the Docker container. As described above, once a process SPI is allocated in the daemon process to correspond to a service process, even if it is detected that the current service process crashes, the daemon process can soon start a new service process which inherits the original SPI.

In some embodiments of the client according to the present disclosure, the inherit request apparatus is configured to enable the service replacement process to send a request to the server for attempting to create a new lock file for the same distributed lock. The inherit request apparatus can be further configured to, if the server feeds back a creation attempt failure, enable the service replacement process to send a request for inheriting the ownership of the distributed lock to the server before the lifecycle expires, the inherit request including the SPI of the service replacement process.

To provide a correct distributed lock, the client and the server understand the expiration time of the same distributed lock differently. As indicated above, the expiration time assumed by the server should be at least twice the expiration time assumed by the client. In other words, upon detecting that the client process crashes suddenly, the server does not consider that the distributed lock has expired. In the worst-case scenario, the immediately rebooted client process waits for the whole expiration time of the server before succeeding in lock contention. Of course, if it takes a long time for the daemon process to restart the crashed client process, and the server considers that the distributed lock expires and deletes the lock file, i.e., releases the distributed lock, during this long period of time, the newly started client process can immediately succeed in lock contention. Therefore, in these embodiments, the client can first send a request to the server for attempting to create a new lock file for the same distributed lock. However, the probability of successfully creating a new lock file is very low. If the server feeds back a creation attempt failure, the request for inheriting the ownership of the distributed lock that the service replacement process sends to the server before the lifecycle of the lock file expires can be a conditional update request, to solve the consistency problem caused by concurrent data operations. Determination conditions can be carried when the client sends the request for inheriting the ownership of the distributed lock. When receiving the request for inheriting the ownership of the distributed lock, the server can determine whether the conditions are met one by one. If the conditions are met, data is updated. That is, the service replacement process is allowed to inherit the ownership of the distributed lock. Otherwise, the update is rejected; that is, the service replacement process is not allowed to inherit the ownership of the distributed lock, and an error can be returned to the client. In these embodiments, the following determination condition can be employed: the server determines whether the SPI of the service replacement process is consistent with the current SPI in the lock file, and if the SPI of the service replacement process is consistent with the current SPI, the service replacement process is allowed to inherit the ownership of the distributed lock; if the SPI of the service replacement process is not consistent with the current SPI, the service replacement process is not allowed to inherit the ownership of the distributed lock.

In some embodiments of the client according to the present disclosure, the inherit request apparatus is configured to enable the service replacement process to send a request for deleting the lock file created by the service process to the server before the lifecycle of the lock file expires, the deletion request including the SPI of the service replacement process. The inherit request apparatus can also be configured to enable the service replacement process to send a request for creating a new lock file for the same distributed lock to the server.

Specifically, in these embodiments, the inherit request can include the deletion request and the subsequent creation request. The deletion request can include the SPI of the service replacement process. The request for deleting the lock file created by the service process that the service replacement process sends to the server before the lifecycle of the lock file expires can be a conditional update request, to solve the consistency problem caused by concurrent data operations. Determination conditions can be carried when the client sends the request for deleting the lock file created by the service process. When receiving the request for deleting the lock file created by the service process, the server can determine whether the conditions are met one by one. If the conditions are met, data is updated. That is, the server agrees to delete the lock file created by the service process. Otherwise, the update is rejected; that is, the server does not agree to delete the lock file created by the service process, and can return an error to the client. In these embodiments, the following determination condition can be employed: the server determines whether the SPI of the service replacement process is consistent with the current SPI in the lock file, and if the SPI of the service replacement process is consistent with the current SPI, the server agrees to delete the lock file created by the service process, and then the client can continue to send a creation request for the same distributed lock based on deletion success feedback received from the server; if the SPI of the service replacement process is not consistent with the current SPI, the server does not agree to delete the lock file created by the service process.

In some embodiments of the client according to the present disclosure, the inherit request apparatus is configured to send a transaction ID acquisition request to the server, to acquire the transaction ID generated during creation of the lock file from the lock file of the server, such that the service replacement process sends a request for deleting the lock file created by the service process to the server before the lifecycle expires, the deletion request further including the transaction ID generated during creation of the lock file, wherein specifically, a globally unique transaction ID is allocated to each corresponding data update request in the distributed consensus system, the transaction IDs are sequential, and a larger value denotes that the transaction request is initiated later. The inherit request apparatus can also be configured to receive feedback about whether deletion of the lock file is successful from the server, wherein the server feeds back whether the lock file is deleted successfully based on whether the transaction ID in the deletion request is consistent with the transaction ID generated during creation in the current lock file for the distributed lock of the server, and send a request for creating a new lock file for the same distributed lock to the server based on the deletion success feedback received from the server, if the deletion succeeds.

Here, the inherit request can include the deletion request and the subsequent creation request. The deletion request can include the SPI of the service replacement process. The request for deleting the lock file created by the service process that the service replacement process sends to the server before the lifecycle of the lock file expires can be a conditional update request, to solve the consistency problem caused by concurrent data operations. Determination conditions can be carried when the client sends the request for deleting the lock file created by the service process. When receiving the request for deleting the lock file created by the service process, the server can determine whether the conditions are met one by one. If the conditions are met, data is updated. That is, the server agrees to delete the lock file created by the service process. Otherwise, the update is rejected; that is, the server does not agree to delete the lock file created by the service process, and can return an error to the client. In these embodiments, the following determination conditions can be employed: the server determines whether the SPI of the service replacement process is consistent with the current SPI in the lock file and determines whether the transaction ID in the request is consistent with the transaction ID generated during creation in the current lock file for the distributed lock of the server. If both the SPIs and the transaction IDs are consistent, the server agrees to delete the lock file created by the service process. Then, the client can continue to send a request for creating a new lock file for the same distributed lock to the server based on deletion success feedback received from the server. If the SPIs are inconsistent or the transaction IDs are inconsistent, the server does not agree to delete the lock file created by the service process. These embodiments can delete the distributed lock file based on a comparison of transaction IDs, and can release the ownership of the distributed lock actively and correctly, avoiding having a request packet for deleting a lock file float over the network and a valid distributed lock occupied by another process ultimately being deleted by mistake. For example, service process 8 originally owns a distributed lock file A. Process 8 can actively release the ownership, that is, the distributed lock file A can be deleted by service process 8. However, the distributed lock file A can also be deleted automatically by the server after the server determines that the distributed lock file A expires. As such, process 9 has the opportunity to own the lock. For example, the transaction ID generated when the newly started service process 8 creates the lock file A is 1000, and the transaction ID carried in the deletion request is 1000. However, as it is detected that the newly started process 8 crashes again when the deletion request arrives at the server, the lock file A has been re-created by the newly started service process 9, and at this point, the transaction ID is 2000. The transaction ID 1000 carried in the deletion request is inconsistent with the latest transaction ID 2000 of the current lock file. As a result, service process 8 is not the owner of the current lock file A and does not have the right to delete the lock file A. Therefore, the deletion request from service process 8 needs to be ignored. It should be noted here that, although the distributed lock A can be deleted automatically by the server, it takes a long time. Service process 8 can safely and actively delete the lock file in a timely manner before the end of the lifecycle only by introducing the mechanism of the present disclosure. If it is determined based on the transaction ID that service process 8 has lost the ownership of the distributed lock file A, the server will not accept the deletion request from service process 8.

In some embodiments of the client according to the present disclosure, after receiving feedback about whether deletion of the lock file is successful from the server, the inherit request apparatus can be further configured to receive from the server feedback indicating that the service replacement process fails in contention for the lock file, if the deletion fails.

Here, if the server compares the transaction ID in the deletion request with the transaction ID generated during creation in the current lock file for the distributed lock of the server and finds them inconsistent, the server can determine that the service replacement process is not an inheritor of the original service process, and can send feedback indicating that the service replacement process fails in contention for the lock file to the client. These embodiments can delete the distributed lock file based on a comparison of transaction IDs, and release the ownership of the distributed lock actively and correctly, thus avoiding having a request packet for deleting a lock file float over the network and a valid distributed lock occupied by another process ultimately being deleted by mistake.

In some embodiments of the client according to the present disclosure, after enabling the service replacement process to send a request to the server for attempting to create a new lock file having a lifecycle for the same distributed lock before the lifecycle of the lock file expires, the inherit request apparatus is further configured to acquire feedback indicating that the service replacement process succeeds in contention for the distributed lock from the server, if the server succeeds in the creation attempt.

To provide a correct distributed lock, the client and the server understand the expiration time of the same distributed lock differently. As indicated above, the expiration time assumed by the server should be at least twice the expiration time assumed by the client. In other words, upon detecting that the client process crashes suddenly, the server does not consider that the distributed lock has expired. In the worst-case scenario, the immediately rebooted client process waits for the whole expiration time of the server before succeeding in lock contention. Of course, if it takes a long time for the daemon process to restart the crashed client process, and the server considers that the distributed lock expires and deletes the lock file, i.e., releases the distributed lock, during this long period of time, the newly started client process can immediately succeed in lock contention. Therefore, in these embodiments, the client can first send a request to the server for attempting to create a new lock file for the same distributed lock. If the server succeeds in the creation attempt, feedback indicating that the service replacement process succeeds in contention for the distributed lock can be acquired from the server.

The present disclosure further provides a server, including a creation apparatus, a writing apparatus, and an allocation apparatus.

The creation apparatus is configured to create a lock file having a lifecycle for a corresponding distributed lock according to a lock file creation request received from a service process of a client. Here, the service process of the client establishes a connection with the server. A session is created on the connection. Based on the session, the client requests the server to create a lock file for the distributed lock. The lifecycle of the lock file is consistent with a lifecycle of the session at the server. That is, when the lifecycle of the session at the server expires, the lock file corresponding to the session can also be deleted. In addition, the SPI can be a globally unique SPI corresponding to a distributed application service process. The SPI can be maintained in a daemon process on the client. When starting the service process, the daemon process can transmit the allocated globally unique SPI to the service process as a start parameter. Here, the daemon process manages all business processes of various services on a client machine. Therefore, the daemon process has the opportunity to allocate a globally unique SPI to each service process, and transmit the SPI to the business service process as a start parameter. The daemon process introduces a globally unique SPI for each distributed application service process, and uses the SPI to directly manage ownership of the distributed lock. When being started by the daemon process, each business service process can acquire its own SPI serving as a process start parameter, and write the SPI into the distributed lock file when succeeding in contention for the lock. When failover occurs in the service process, the daemon process can also transmit the recorded SPI value of the service process as a start parameter to the new inheriting service process, i.e., the service replacement process. In these embodiments, a business service process can be started by using the globally unique SPI managed by the daemon process as the start parameter. Moreover, the original SPI continues to be used in a failover scenario. When the business service process exits abnormally, the daemon process can find and restart the service process. As shown in FIG. 4, the daemon service process manages two business service processes A and B. The daemon process allocates the globally unique SPI A and SPI B to business service processes A and B and uses them as process start parameters to awaken business service process A and business service process B, respectively.

When business service process B exits abnormally, the daemon process can sense the exit and attempt to restart service process B. The newly started service process is referred to as B'. As an inheritor, service process B' uses the original SPI B as the start parameter. According to the globally unique SPI, service process B' should inherit all rights of the original service process B, including the ownership of the distributed lock occupied by the original service process B.

The writing apparatus is configured to write the unique SPI of the service process into the lock file according to an SPI writing request received from the service process, wherein the client starts a new service replacement process upon a service process crash is detected, to replace the crashed service process, and allocates the SPI of the crashed service process to the service replacement process.

The allocation apparatus is configured to: acquire a distributed lock inherit request sent by the service replacement process before the lifecycle of the lock file expires, the inherit request including the SPI of the service replacement process; determine whether the SPI of the service replacement process is consistent with the current SPI in the lock file; and if the SPI of the service replacement process is consistent with the current SPI, create a new lock file of the same distributed lock for the service replacement process. Specifically, the request for inheriting the ownership of the distributed lock that the service replacement process sends to the server before the lifecycle of the lock file expires can be a conditional update request, to solve the consistency problem caused by concurrent data operations. Determination conditions can be carried when the client sends the request for inheriting the ownership of the distributed lock. When receiving the request for inheriting the ownership of the distributed lock, the server can determine whether the conditions are met one by one. If the conditions are met, data is updated. That is, the service replacement process is allowed to inherit the ownership of the distributed lock. Otherwise, the update is rejected; that is, the service replacement process is not allowed to inherit the ownership of the distributed lock, and an error can be returned to the client. In these embodiments, the following determination condition can be employed: the server determines whether the SPI of the service replacement process is consistent with the current SPI in the lock file, and if the SPI of the service replacement process is consistent with the current SPI, the service replacement process is allowed to inherit the ownership of the distributed lock; if the SPI of the service replacement process is not consistent with the current SPI, the service replacement process is not allowed to inherit the ownership of the distributed lock. The SPI of the service replacement process being inconsistent with the current SPI in the lock file can be one of the following scenarios.

For example, an application starts three service processes simultaneously. It is certain that only one of the service processes can succeed in contention for the distributed lock, and the other two service processes find that their own SPIs are inconsistent with the SPI in the content of the lock file.

For another example, in the scenario of starting a new service process, if the service process is started so slowly that the backend lock file is actively released by the server, another service process succeeds in contention for the lock, and an SPI value of the another service process is written into the content of the lock file, the newly started service process fails in contention for the lock.

In the above embodiments, a globally unique SPI is introduced for each distributed application service process while guaranteeing the correctness of the distributed lock, and the SPI is used to directly manage the ownership of the distributed lock. The service replacement process sends the request for inheriting the ownership of the distributed lock to the server before the lifecycle of the lock file expires, the inherit request including the SPI of the service replacement process. Therefore, that the service replacement process can actively and quickly inherit the ownership of the original distributed lock in a zero wait-state can be supported in a service process failover scenario, avoiding the problem of a service-unavailable time window in the conventional systems. In a failover scenario, when the newly started service replacement process contends for the distributed lock, the server can compare the SPI of the service replacement process with an owner's SPI recorded in the distributed lock file, to determine whether the service process replaced by the service replacement process initiating the request originally occupied the same distributed lock. If the service process replaced by the service replacement process initiating the request originally occupied the same distributed lock, it is considered that the service replacement process originally occupies the distributed lock. Therefore, the distributed lock file is deleted to guarantee that the ownership of the distributed lock can be released actively and correctly, thus supporting direct contention for the distribution lock in a zero wait-state, and significantly improving the continuity of the business service in a failover scenario.

Specifically, a mechanism for generating the globally unique SPI of the business service process is as shown in FIG. 5. The SPI includes two parts: a client hostname used for distinguishing business service processes on different machines, and a locally unique ID of the service process, which can be a current timestamp, a UUID value, or the like. The locally unique ID is used for guaranteeing that business SPIs are not repeated in every client. The specific implementation relies on a management mechanism of the daemon process in an actual business scenario. For example, a container ID in a mainstream Docker container technology is an appropriate SPI value that can uniquely identify a service process in the Docker container. As described above, once a process SPI is allocated in the daemon process to correspond to a service process, even if it is detected that the current service process crashes, the daemon process can soon start a new service process which inherits the original SPI.

In some embodiments of the server according to the present disclosure, the allocation apparatus is configured to attempt to create a new lock file of the same distributed lock for the service replacement process according to a re-creation attempt request received from the service replacement process, and if the attempt fails, feed back a creation attempt failure to the service replacement process. The allocation apparatus can be further configured to: acquire the distributed lock inherit request sent by the service replacement process before the lifecycle of the lock file expires, the inherit request including the SPI of the service replacement process; determine whether the SPI of the service replacement process is consistent with the current SPI in the lock file; and if the SPI of the service replacement process is consistent with the current SPI, create a new lock file of the same distributed lock for the service replacement process.

To provide a correct distributed lock, the client and the server understand the expiration time of the same distributed lock differently. As indicated above, the expiration time assumed by the server should be at least twice the expiration time assumed by the client. In other words, upon detecting that the client process crashes suddenly, the server does not consider that the distributed lock has expired. In the worst-case scenario, the immediately rebooted client process waits for the whole expiration time of the server before succeeding in lock contention. Of course, if it takes a long time for the daemon process to restart the crashed client process, and the server considers that the distributed lock expires and deletes the lock file, i.e., releases the distributed lock, during this long period of time, the newly started client process can immediately succeed in lock contention. Therefore, in these embodiments, the client can first send a request to the server for attempting to create a new lock file for the same distributed lock. However, the probability of successfully creating a new lock file is very low. If the server feeds back a creation attempt failure, the request for inheriting the ownership of the distributed lock that the service replacement process sends to the server before the lifecycle of the lock file expires can be a conditional update request, to solve the consistency problem caused by concurrent data operations. Determination conditions can be carried when the client sends the request for inheriting the ownership of the distributed lock. When receiving the request for inheriting the ownership of the distributed lock, the server can determine whether the conditions are met one by one. If the conditions are met, data is updated. That is, the service replacement process is allowed to inherit the ownership of the distributed lock. Otherwise, the update is rejected; that is, the service replacement process is not allowed to inherit the ownership of the distributed lock, and an error can be returned to the client. In these embodiments, the following determination condition can be employed: the server determines whether the SPI of the service replacement process is consistent with the current SPI in the lock file, and if the SPI of the service replacement process is consistent with the current SPI, the service replacement process is allowed to inherit the ownership of the distributed lock; if the SPI of the service replacement process is not consistent with the current SPI, the service replacement process is not allowed to inherit the ownership of the distributed lock.

In some embodiments of the server of the present disclosure, the allocation apparatus is configured to receive a lock file deletion request sent by the service replacement process before the lifecycle of the lock file expires, the lock file deletion request including the SPI of the service replacement process. The allocation apparatus can also be configured to determine whether the SPI of the service replacement process is consistent with the current SPI in the lock file according to the lock file deletion request; and if the SPI of the service replacement process is consistent with the current SPI, delete the lock file created by the service process. The allocation apparatus can further be configured to create a new lock file of the same distributed lock for the replacement process according to the creation request received from the service replacement process.

Here, in these embodiments, the inherit request can include the deletion request and the subsequent creation request. The deletion request can include the SPI of the service replacement process. The request for deleting the lock file created by the service process that the service replacement process sends to the server before the lifecycle of the lock file created by a conditional update request, to solve the consistency problem caused by concurrent data operations. Determination conditions can be carried when the client sends the request for deleting the lock file created by the service process. When receiving the request for deleting the lock file created by the service process, the server can determine whether the conditions are met one by one. If the conditions are met, data is updated. That is, the server agrees to delete the lock file created by the service process. Otherwise, the update is rejected; that is, the server does not agree to delete the lock file created by the service process, and can return an error to the client. In these embodiments, the following determination condition can be employed: the server determines whether the SPI of the service replacement process is consistent with the current SPI in the lock file, and if the SPI of the service replacement process is consistent with the current SPI, the server agrees to delete the lock file created by the service process, and then the client can continue to send a creation request for the same distributed lock based on deletion success feedback received from the server; if the SPI of the service replacement process is not consistent with the current SPI, the server does not agree to delete the lock file created by the service process.

In some embodiments of the server according to the present disclosure, after creating a lock file having a lifecycle for a corresponding distributed lock, the writing apparatus is further configured to write the transaction ID generated during creation of the lock file into the lock file.

The allocation apparatus is configured to send the transaction ID generated during creation of the lock file to the client according to a transaction ID acquisition request received from the client; receive the lock file deletion request sent by the service replacement process before the lifecycle of the lock file expires, the lock file deletion request including the SPI of the service replacement process and the transaction ID generated during creation of the lock file; and determine whether the transaction ID in the lock file deletion request is consistent with the transaction ID generated during creation in the current lock file for the distributed lock of the server, and if the transaction ID in the lock file deletion request is consistent with the transaction ID generated during creation in the current lock file for the distributed lock of the server, delete the lock file created by the service process, feed back a deletion success to the service replacement process, and acquire a request for creating a new lock file for the same distributed lock sent by the service replacement process.

Specifically, a globally unique transaction ID is allocated correspondingly to each data update request in the distributed consensus system. The transaction IDs are sequential, and a larger value denotes that the transaction request is initiated later. Here, the inherit request can include the deletion request and the subsequent creation request. The deletion request can include the SPI of the service replacement process. The request for deleting the lock file created by the service process that the service replacement process sends to the server before the lifecycle of the lock file expires can be a conditional update request, to solve the consistency problem caused by concurrent data operations. Determination conditions can be carried when the client sends the request for deleting the lock file created by the service process. When receiving the request for deleting the lock file created by the service process, the server can determine whether the conditions are met one by one. If the conditions are met, data is updated. That is, the server agrees to delete the lock file created by the service process. Otherwise, the update is rejected; that is, the server does not agree to delete the lock file created by the service process, and can return an error to the client. In these embodiments, the following determination conditions can be employed: the server determines whether the SPI of the service replacement process is consistent with the current SPI in the lock file and determines whether the transaction ID in the request is consistent with the transaction ID generated during creation in the current lock file for the distributed lock of the server. If both the SPIs and the transaction IDs are consistent, the server agrees to delete the lock file created by the service process. Then, the client can continue to send a request for creating a new lock file for the same distributed lock to the server based on deletion success feedback received from the server. If the SPIs are inconsistent or the transaction IDs are inconsistent, the server does not agree to delete the lock file created by the service process. These embodiments can delete the distributed lock file based on a comparison of transaction IDs, and can release the ownership of the distributed lock actively and correctly, avoiding having a request packet for deleting a lock file float over the network and a valid distributed lock occupied by another process ultimately being deleted by mistake. For example, service process 8 originally owns a distributed lock file A. Process 8 can actively release the ownership, that is, the distributed lock file A can be deleted by service process 8. However, the distributed lock file A can also be deleted automatically by the server after the server determines that the distributed lock file A expires. As such, process 9 has the opportunity to own the lock. For example, the transaction ID generated when the newly started service process 8 creates the lock file A is 1000, and the transaction ID carried in the deletion request is 1000. However, as it is detected that the newly started process 8 crashes again when the deletion request arrives at the server, the lock file A has been re-created by the newly started service process 9, and at this point, the transaction ID is 2000. The transaction ID 1000 carried in the deletion request is inconsistent with the latest transaction ID 2000 of the current lock file. As a result, service process 8 is not the owner of the current lock file A and does not have the right to delete the lock file A. Therefore, the deletion request from service process 8 needs to be ignored. It should be noted here that, although the distributed lock A can be deleted automatically by the server, it takes a long time. Service process 8 can safely and actively delete the lock file in a timely manner before the end of the lifecycle only by introducing the mechanism of the present disclosure. If it is determined based on the transaction ID that service process 8 has lost the ownership of the distributed lock file A, the server will not accept the deletion request from service process 8.

In some embodiments of the server according to the present disclosure, after feeding back whether the lock file is deleted successfully to the service replacement process, the allocation apparatus is configured to feed back a lock file contention failure to the service replacement process if the deletion fails. Here, if the server compares the transaction ID in the deletion request with the transaction ID generated during creation in the current lock file for the distributed lock of the server and finds them inconsistent, the server can determine that the service replacement process is not an inheritor of the original service process, and can send feedback indicating that the service replacement process fails in contention for the lock file to the client. These embodiments can delete the distributed lock file based on a comparison of transaction IDs, and release the ownership of the distributed lock actively and correctly, thus avoiding having a request packet for deleting a lock file float over the network and a valid distributed lock occupied by another process ultimately being deleted by mistake.

In some embodiments of the server according to the present disclosure, after attempting to create a new lock file of the same distributed lock for the service replacement process, the allocation apparatus is configured to feed back a lock file contention success to the service replacement process if the creation attempt succeeds. Here, to provide a correct distributed lock, the client and the server understand the expiration time of the same distributed lock differently. As indicated above, the expiration time assumed by the server should be at least twice the expiration time assumed by the client. In other words, upon detecting that the client process crashes suddenly, the server does not consider that the distributed lock has expired. In the worst-case scenario, the immediately rebooted client process waits for the whole expiration time of the server before succeeding in lock contention. Of course, if it takes a long time for the daemon process to restart the crashed client process, and the server considers that the distributed lock expires and deletes the lock file, i.e., releases the distributed lock, during this long period of time, the newly started client process can immediately succeed in lock contention. Therefore, in these embodiments, the client can first send a request to the server for attempting to create a new lock file for the same distributed lock. If the server succeeds in the creation attempt, feedback indicating that the service replacement process succeeds in contention for the distributed lock can be acquired from the server.

According to some embodiments of the present disclosure, a computing-based device is further provided, including a processor and a memory configured to store computer executable instructions that, when executed, enable the processor to perform several steps. The steps can include allocating a unique SPI to a service process, such that after requesting a server to create a lock file having a lifecycle for a distributed lock, the service process sends a request to the server to write the SPI into the lock file. The steps can also include starting a new service replacement process upon a service process crash is detected, to replace the crashed service process, and allocating the SPI of the crashed service process to the service replacement process. The steps can further include enabling the service replacement process to send a request for inheriting ownership of the distributed lock to the server before the lifecycle of the lock file expires, the inherit request including the SPI of the service replacement process.

According to some embodiments of the present disclosure, a computing-based device is further provided, including a memory configured to store computer executable instructions and a processor configured to execute the instructions to cause the computing-based device to perform several steps. The steps can include creating a lock file having a lifecycle for a corresponding distributed lock according to a lock file creation request received from a service process of a client. The steps can also include writing the unique SPI of the service process into the lock file according to an SPI writing request received from the service process, wherein the client starts a new service replacement process upon a service process crash is detected, to replace the crashed service process, and allocates the SPI of the crashed service process to the service replacement process. The method can further include acquiring a distributed lock inherit request sent by the service replacement process before the lifecycle of the lock file expires, the inherit request including the SPI of the service replacement process; determine whether the SPI of the service replacement process is consistent with the current SPI in the lock file; and if the SPI of the service replacement process is consistent with the current SPI, create a new lock file of the same distributed lock for the service replacement process.

According to some embodiments of the present disclosure, a non-transitory computer readable storage medium storing computer executable instructions is further provided, wherein when executed by an electronic device, the computer executable instructions enables the electronic device to perform several steps. The steps can include allocating a unique SPI to a service process, such that after requesting a server to create a lock file having a lifecycle for a distributed lock, the service process sends a request to the server to write the SPI into the lock file. The steps can also include starting a new service replacement process upon a service process crash is detected, to replace the crashed service process, and allocating the SPI of the crashed service process to the service replacement process. The steps can further include enabling the service replacement process to send a request for inheriting ownership of the distributed lock to the server before the lifecycle of the lock file expires, the inherit request including the SPI of the service replacement process.

According to some embodiments of the present disclosure, a non-transitory computer readable storage medium storing computer executable instructions is further provided, wherein when executed by an electronic device, the computer executable instructions enable the electronic device to perform several steps. The steps can include creating a lock file having a lifecycle for a corresponding distributed lock according to a lock file creation request received from a service process of a client. The steps can also include writing the unique SPI of the service process into the lock file according to an SPI writing request received from the service process, wherein the client starts a new service replacement process upon a service process crash is detected, to replace the crashed service process, and allocating the SPI of the crashed service process to the service replacement process. The steps can further include: acquiring a distributed lock inherit request sent by the service replacement process before the lifecycle of the lock file expires, the inherit request including the SPI of the service replacement process; determining whether the SPI of the service replacement process is consistent with the current SPI in the lock file; and if the SPI of the service replacement process is consistent with the current SPI, creating a new lock file of the same distributed lock for the service replacement process.

According to some embodiments of the present disclosure, a method for acquiring a lock file is further provided, including creating a first service process, wherein the SPI of the first service process is identical to the SPI of a crashed second service process, the second service process corresponding to a lock file. The method can further include the first service process sending a lock file inherit request, wherein the inherit request includes the SPI of the first service process.

In the above method, the step of the first service process sending a lock file inherit request can include the first service process sending a lock file re-creation attempt request, and if the re-creation attempt fails, the first service process sending a request for inheriting ownership of the distributed lock.

According to some embodiments of the present disclosure, a method for acquiring a lock file is further provided, including creating a service process, wherein the service process includes an SPI. The method can also include the service process sending a lock file creation request, wherein the creation request includes the SPI of the service process.

In the above method, after the step of the service process sending a lock file creation request, the method can further include starting a new service replacement process upon a service process crash is detected, to replace the crashed service process, and allocating the SPI of the crashed service process to the service replacement process.

Figure 6:
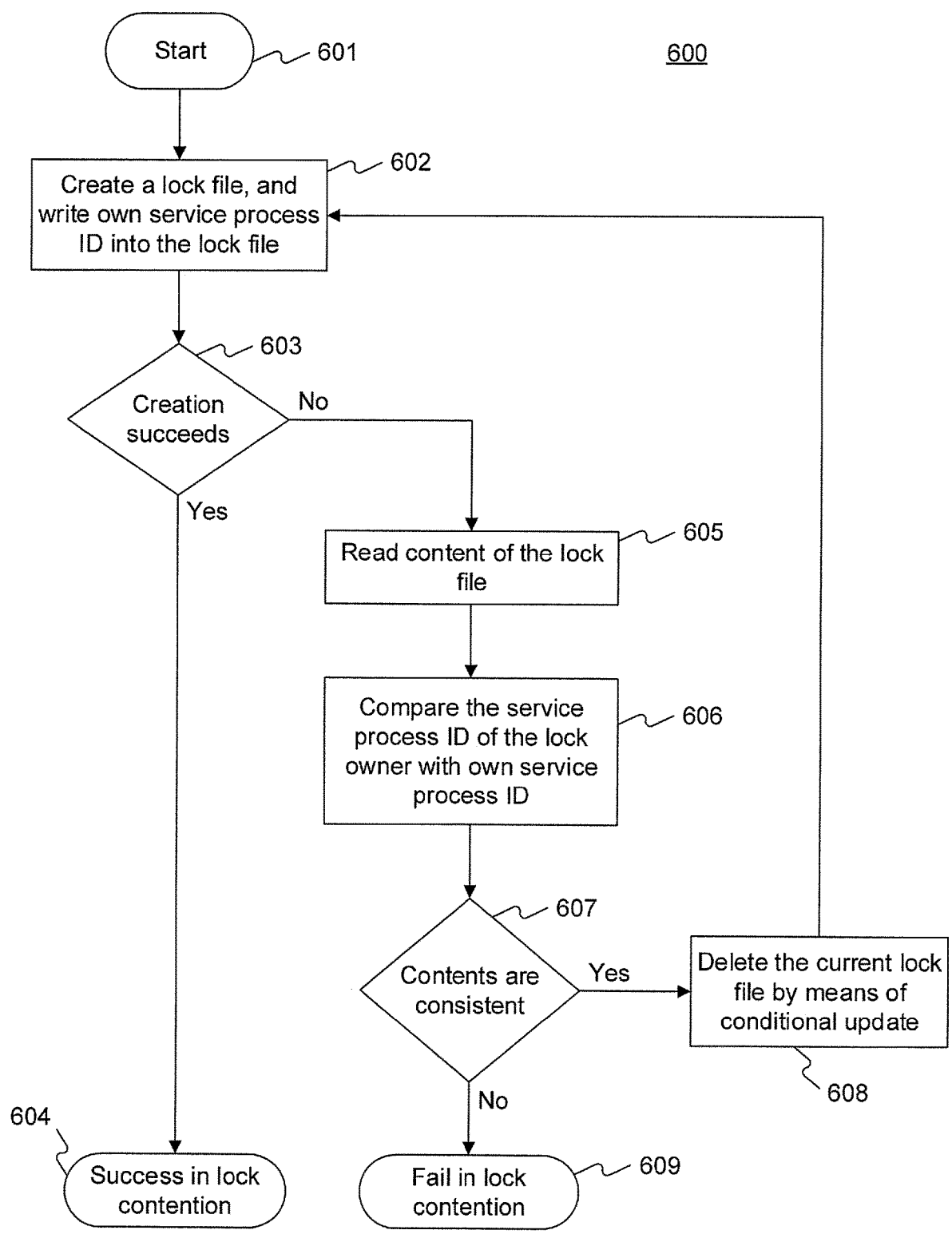
FIG. 6 is a flowchart of some embodiments of the present disclosure.

In some embodiments of the present disclosure, as shown in FIG. 6, a procedure 600 in which a business service process contends for a distributed lock in a failover scenario in a zero wait-state or with a shorter waiting time based on a globally unique SPI is provided, to guarantee continuity of the business service.

When a daemon process on a machine starts 601 a new business service process, the service process can acquire an allocated SPI, and then attempt to contend for the distributed lock, i.e., create 602 a corresponding distributed lock file. The content of the distributed lock file is its own SPI.

If the lock file corresponding to the distributed lock is not present, the creation succeeds 603. Then, the service process directly succeeds 604 in lock contention, such that the business service can be provided continuously.

If the lock contention fails, indicating that the lock file corresponding to the distributed lock exists, the newly started business service process can read 605 the content of the current distributed lock file, i.e., the SPI of a service process that owns the distributed lock. Then, a comparison 606 is made to determine whether the SPI of the newly started service process is equal to the SPI in the current distributed lock file.

If the SPI of the newly started service process is equal to 607 the SPI in the current distributed lock file, it can be determined that the owner of the distributed lock is the original service process before failover. Therefore, the newly started service process can inherit the ownership of the distributed lock. As a result, the current distributed lock file can be deleted 608 by means of conditional update. A new lock file for the distributed lock can be created after the ownership of the distributed lock is released actively.

If the SPI of the newly started service process is not equal to the SPI in the current distributed lock file, the newly started service process fails 609 in lock contention.

Figure 7:
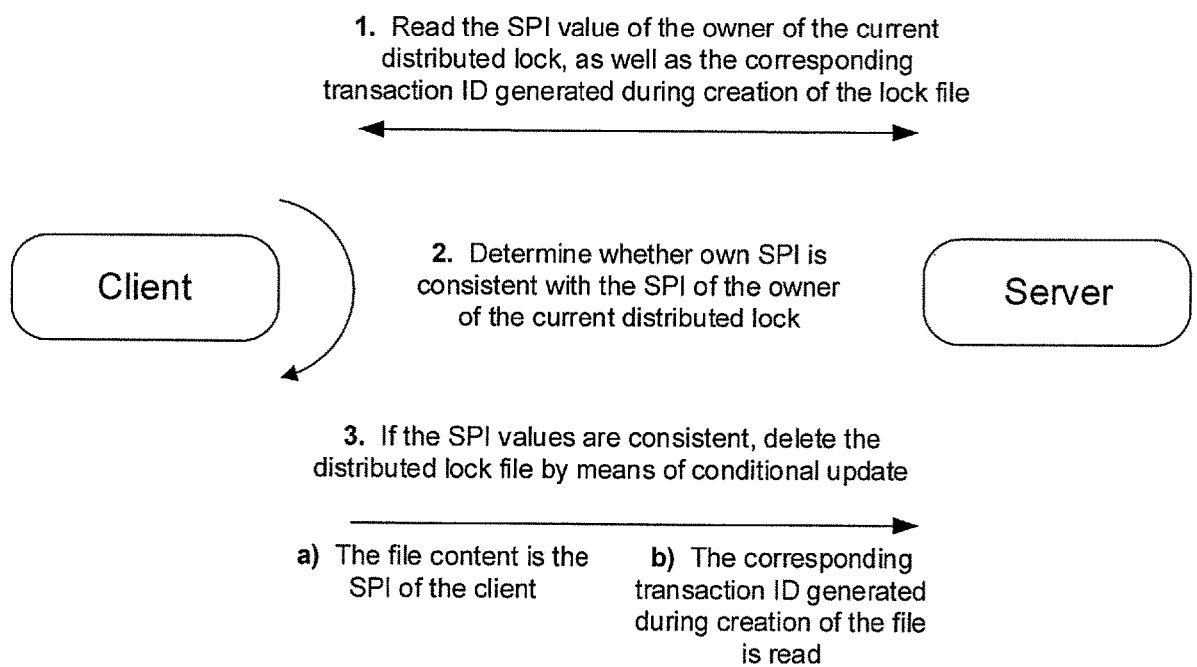
FIG. 7 is a principle diagram of a conditional update manner according to some embodiments of the present disclosure.

FIG. 7 provides a method for deleting a distributed lock file actively and correctly by means of conditional update. When accessing a lock file in a back-end quorum server, a client process can acquire the following two pieces of information: 1) the content of the current distributed lock file, i.e., the SPI of the service process that actually owns the distributed lock; and 2) the corresponding globally unique transaction ID generated during creation of the current distributed lock file. When it is determined that the value of the SPI of the client process is consistent with the SPI value of the owner of the distributed lock, i.e., the client process inherits the ownership of the distributed lock, the client process can send a request for deleting the distributed lock file to the server by means of conditional update. Two specific conditions for determination by the quorum server include: 1): the SPI value carried in the request from the client is the content of the current distributed lock file; and 2) the transaction ID carried in the request from the client request is the corresponding transaction ID generated during creation of the current distributed lock file. Once the above conditions are both met, the quorum server can delete the distributed lock file and release the ownership of the distributed lock.

To summarize the above, there is provided, in some embodiments, a mechanism for contending a distribution lock in a granularity of a zero wait-state under the premise that the correctness of a distributed lock can be ensured. The mechanism can effectively address the need to improve the availability of a distributed application service process in a failover scenario. A globally unique SPI is introduced for each distributed application service process while guaranteeing the correctness of the distributed lock, and the SPI is used to directly manage the ownership of the distributed lock. The service replacement process sends the request for inheriting the ownership of the distributed lock to the server before the lifecycle of the lock file expires, the inherit request including the SPI of the service replacement process. Therefore, that the service replacement process can actively and quickly inherit the ownership of the original distributed lock in a zero wait-state can be supported in a service process failover scenario, avoiding the problem of a service-unavailable time window in the conventional systems. In a failover scenario, when the newly started service replacement process contends for the distributed lock, the server can compare the SPI of the service replacement process with an owner's SPI recorded in the distributed lock file, to determine whether the service process replaced by the service replacement process initiating the request originally occupied the same distributed lock. If the service process replaced by the service replacement process initiating the request originally occupied the same distributed lock, it is considered that the service replacement process originally occupied the distributed lock. Therefore, the distributed lock file is deleted to guarantee that the ownership of the distributed lock can be released actively and correctly, thus supporting direct contention for the distribution lock in a zero wait-state, and significantly improving the continuity of the business service in a failover scenario.

It is appreciated that various changes and modifications to the present disclosure without departing from the spirit and scope of the present disclosure. In this way, if the modifications and variations of the present disclosure are incorporated in the scope of the claims of the present disclosure and equivalent techniques, the present disclosure is also intended to incorporate the modifications and variations.

It should be noted that the present disclosure may be implemented by software or a combination of software and hardware. For example, the present invention may be implemented by an application-specific integrated circuit (ASIC) or any other similar hardware devices. In some embodiments, the software program of the present disclosure may be executed by a processor to implement the aforementioned steps or functions. Likewise, the software program of the present disclosure (including relevant data structures) may be stored in a computer-readable recording medium, for example, a RAM, a magnetic or optical driver, a floppy disk, cloud storage, or a similar device. Additionally, some steps or functions of the present disclosure may be implemented using hardware, for example, implemented as a circuit cooperating with the processor to perform various functions or steps.

In addition, a part of the present disclosure can be applied as a computer program product, such as a computer program instruction. When executed by a computer, the computer program instruction can call or provide the method or technical solution according to the present disclosure based on operations of the computer. The program instruction calling the method of the present disclosure may be stored in a fixed or removable recording medium, or transmitted by broadcasting or by a data stream in another signal bearing medium, or stored in a working memory of a computer device that runs according to the program instruction. Here, some embodiments according to the present disclosure include an apparatus, which includes a memory configured to store a computer program instruction and a processor configured to execute the program instruction. When executed by the processor, the computer program instruction triggers the apparatus to run the methods or technical solutions according to the above embodiments of the present disclosure.

It is appreciated that the present disclosure is not limited to the details of the aforementioned exemplary embodiments, and the present disclosure can be implemented in other specific forms without departing from the spirit or basic features of the present disclosure. Thus, from any perspective, the embodiments should be regarded as exemplary, not limitative. The scope of the present disclosure is defined by the appended claims, rather than the aforementioned depiction. Thus, the present disclosure is intended to cover all variations falling within the meaning and scope of equivalent elements of the claims. It is inappropriate to regard any reference numerals in the claims as limiting the related claims. In addition, it is apparent that the term "include/comprise" does not exclude other units or steps, and the singular form does not exclude the plural form. Multiple units or apparatuses stated in the apparatus claims can also be implemented by one unit or apparatus using software or hardware. Terms such as "first" and "second" are used for representing names, but do not represent any particular sequence.

The invention claimed is:

1. An allocation method for a distributed lock at a server, comprising:
    creating a lock file having a lifecycle for a distributed lock according to a lock file creation request received from a service process of a client;
    writing a unique service process ID (SPI) of the service process into the lock file according to an SPI writing request received from the service process, wherein upon a service process crash is detected, a service replacement process is initiated for allocating the SPI of the crashed service process to the service replacement process;
    acquiring a distributed lock inherit request sent by the service replacement process before the lifecycle of the lock file expires, the distributed lock inherit request including the SPI and indicating a request for inheriting ownership of the distributed lock to the server, the distributed lock inherit request further including a lock file deletion request for deleting the lock file created based on the request from the service process;
    determining whether the SPI of the service replacement process is consistent with an SPI in the lock file; and
    in response to the SPI of the service replacement process being consistent with the SPI in the lock file, deleting the lock file created according to the lock file creation request received from the service process and creating a new lock file of the distributed lock for the service replacement process, wherein deleting the lock file is based on a comparison of a transaction ID generated during creation of the lock file and a transaction ID in the lock file deletion request.

2. The method of claim 1, wherein creating the new lock file comprises:
    attempting to create the new lock file of the distributed lock for the service replacement process according to a re-creation attempt request received from the service replacement process;
    in response to the attempt failing, feeding back a creation attempt failure to the service replacement process;
    acquiring a distributed lock inherit request sent by the service replacement process before the lifecycle of the lock file expires, the distributed lock inherit request including the SPI of the service replacement process;

determining whether the SPI of the service replacement process is consistent with an SPI in the lock file; and in response to the SPI of the service replacement process being consistent with the SPI in the lock file, creating the new lock file of the distributed lock for the service replacement process.

3. The method of claim 2, wherein after attempting to create the new lock file of the same distributed lock for the service replacement process, the method further comprises:

feeding back a distributed lock contention success to the service replacement process in response to the creation attempt succeeding.

4. The method of claim 1, wherein acquiring the distributed lock inherit request, determining whether the SPI of the service replacement process is consistent with the SPI in the lock file, and creating the new lock file comprises:

receiving the lock file deletion request, the lock file deletion request including the SPI of the service replacement process;

determining whether the SPI of the service replacement process is consistent with the SPI in the lock file according to the lock file deletion request;

in response to the SPI of the service replacement process being consistent with the SPI in the lock file, deleting the lock file created by the service process; and creating the new lock file of the distributed lock for the replacement process according to a creation request received from the service replacement process.

5. The method of claim 4, wherein after creating the lock file having the lifecycle for the distributed lock, the method further comprises:

writing into the lock file the transaction ID generated during creation of the lock file;

receiving the lock file deletion request, the lock file deletion request including the SPI of the service replacement process, the receiving further comprises:

sending the transaction ID generated during creation of the lock file to the client according to a transaction ID acquisition request received from the client; and receiving the lock file deletion request, the lock file deletion request including the SPI of the service replacement process and the transaction ID generated during creation of the lock file; and deleting the lock file created by the service process, the deleting further comprises:

determining whether the transaction ID in the lock file deletion request is consistent with the transaction ID generated during creation in the lock file for the distributed lock of the server, and in response to the transaction ID in the lock file deletion request being consistent with the generated transaction ID, deleting the lock file created by the service process, feeding back a deletion success to the service replacement process, and acquiring a request sent by the service replacement process for creating a new lock file for the distributed lock.

6. The method of claim 5, wherein after feeding back whether the lock file is deleted successfully, the method further comprises:

feeding back a lock file contention failure to the service replacement process in response to the deletion failing.

7. A server, comprising:

a creation apparatus configured to create a lock file having a lifecycle for a distributed lock according to a lock file creation request received from a service process of a client;

a writing apparatus configured to write a unique service process ID (SPI) of the service process into the lock file according to an SPI writing request received from the service process, wherein upon a service process crash is detected, a service replacement process is initiated for allocating the SPI of the crashed service process to the service replacement process; and an allocation apparatus configured to:

acquire a distributed lock inherit request sent by the service replacement process before the lifecycle of the lock file expires, the distributed lock inherit request including the SPI and indicating a request for inheriting ownership of the distributed lock to the server, and the distributed lock inherit request further including a lock file deletion request for deleting the lock file created based on the request from the service process;

determine whether the SPI of the service replacement process is consistent with an SPI in the lock file; and in response to the SPI of the service replacement process being consistent with the SPI in the lock file, delete the lock file created according to the lock file creation request received from the service process and create a new lock file of the distributed lock for the service replacement process, wherein deleting the lock file is based on a comparison of a transaction ID generated during creation of the lock file and a transaction ID in the lock file deletion request.

8. The server of claim 7, wherein the allocation apparatus is configured to:

attempt to create the new lock file of the distributed lock for the service replacement process according to a re-creation attempt request received from the service replacement process, and feed back a creation attempt failure to the service replacement process in response to the attempt failing; and acquire a distributed lock inherit request sent by the service replacement process before the lifecycle of the lock file expires, the distributed lock inherit request including the SPI of the service replacement process, determine whether the SPI of the service replacement process is consistent with an SPI in the lock file, and in response to the SPI of the service replacement process being consistent with the SPI in the lock file, create a new lock file of the distributed lock for the service replacement process.

9. The server of claim 8, wherein after attempting to create the new lock file of the same distributed lock for the service replacement process, the allocation apparatus is configured to feed back a lock file contention success to the service replacement process if the creation attempt succeeds.

10. The server of claim 7, wherein the allocation apparatus is configured to:

receive the lock file deletion request, the lock file deletion request including the SPI of the service replacement process, determine whether the SPI of the service replacement process is consistent with the SPI in the lock file according to the lock file deletion request, and in response to the SPI of the service replacement process being consistent with the SPI in the lock file, delete the lock file created by the service process; and create the new lock file of the distributed lock for the replacement process according to a creation request received from the service replacement process.

11. The server of claim 10, wherein after creating the lock file having the lifecycle for the distributed lock, the writing apparatus is further configured to write a transaction ID generated during creation of the lock file into the lock file, and
the allocation apparatus is further configured to:
send the transaction ID generated during creation of the lock file to the client according to a transaction ID acquisition request received from the client;
receive the lock file deletion request, the lock file deletion request including the SPI of the service replacement process and the transaction ID generated during creation of the lock file, determine whether the transaction ID in the lock file deletion request is consistent with the transaction ID generated during creation in the lock file for the distributed lock of the server; and
in response to the transaction ID in the lock file deletion request being consistent with the generated transaction ID, delete the lock file created by the service process, feed back a deletion success to the service replacement process, and acquire a request sent by the service replacement process for creating a new lock file for the distributed lock.

12. The server of claim 11, wherein after feeding back whether the lock file is deleted successfully, the allocation apparatus is configured to feed back a lock file contention failure to the service replacement process in response to the deletion failing.

13. A computing-based device, comprising:
a memory configured to store computer executable instructions; and
a processor configured to execute the instructions to cause the computing-based device to:
create a lock file having a lifecycle for a distributed lock according to a lock file creation request received from a service process of a client;
write a unique service process ID (SPI) of the service process into the lock file according to an SPI writing request received from the service process, wherein upon a service process crash is detected, a service replacement process is initiated for allocating the SPI of the crashed service process to the service replacement process;
acquire a distributed lock inherit request sent by the service replacement process before the lifecycle of the lock file expires, the distributed lock inherit request including the SPI of the service replacement process and indicating a request for inheriting ownership of the distributed lock to a server, and the distributed lock inherit request further including a lock file deletion request for deleting the lock file created based on the request from the service process; and
determine whether the SPI of the service replacement process is consistent with an SPI in the lock file, and in response to the SPI of the service replacement process being consistent with the SPI in the lock file, delete the lock file created according to the lock file creation request received from the service process and create a new lock file of the distributed lock for the service replacement process, wherein deleting the lock file is based on a comparison of a transaction ID generated during creation of the lock file and a transaction ID in the lock file deletion request.

14. A non-transitory computer-readable storage medium storing a set of instructions that is executable by one or more processors of an electronic device to cause the electronic device to perform a method comprising:
creating a lock file having a lifecycle for a distributed lock according to a lock file creation request received from a service process of a client;
writing a unique service process ID (SPI) of the service process into the lock file according to an SPI writing request received from the service process, wherein upon a service process crash is detected, a service replacement process is initiated for allocating the SPI of the crashed service process to the service replacement process;
acquiring a distributed lock inherit request sent by the service replacement process before the lifecycle of the lock file expires, the distributed lock inherit request including the SPI and indicating a request for inheriting ownership of the distributed lock to a server, and the distributed lock inherit request further including a lock file deletion request for deleting the lock file created based on the request from the service process;
determining whether the SPI of the service replacement process is consistent with an SPI in the lock file; and
in response to the SPI of the service replacement process being consistent with the SPI in the lock file, deleting the lock file created according to the lock file creation request received from the service process and creating a new lock file of the distributed lock for the service replacement process, wherein deleting the lock file is based on a comparison of a transaction ID generated during creation of the lock file and a transaction ID in the lock file deletion request.

15. The non-transitory computer-readable medium of claim 14, wherein creating the new lock file comprises:
attempting to create the new lock file of the distributed lock for the service replacement process according to a re-creation attempt request received from the service replacement process;
in response to the attempt failing, feeding back a creation attempt failure to the service replacement process;
acquiring a distributed lock inherit request sent by the service replacement process before the lifecycle of the lock file expires, the distributed lock inherit request including the SPI of the service replacement process;
determining whether the SPI of the service replacement process is consistent with an SPI in the lock file; and
in response to the SPI of the service replacement process being consistent with the SPI in the lock file, creating a new lock file of the distributed lock for the service replacement process.

16. The non-transitory computer-readable medium of claim 15, wherein after attempting to create the new lock file of the same distributed lock for the service replacement process, the method further comprises:
feeding back a distributed lock contention success to the service replacement process in response to the creation attempt succeeding.

17. The non-transitory computer-readable medium of claim 14, wherein acquiring the distributed lock inherit request, determining whether the SPI of the service replacement process is consistent with the SPI in the lock file, and creating the new lock file comprises:
receiving the lock file deletion request, the lock file deletion request including the SPI of the service replacement process;
determining whether the SPI of the service replacement process is consistent with the SPI in the lock file according to the lock file deletion request;

in response to the SPI of the service replacement process being consistent with the SPI in the lock file, deleting the lock file created by the service process; and creating the new lock file of the distributed lock for the replacement process according to a creation request received from the service replacement process.

18. The non-transitory computer-readable medium of claim 17, wherein after creating the lock file having the lifecycle for the distributed lock, the method further comprises:

writing into the lock file a transaction ID generated during creation of the lock file;

receiving the lock file deletion request, the lock file deletion request including the SPI of the service replacement process, the receiving further comprises:

sending the transaction ID generated during creation of the lock file to the client according to a transaction ID acquisition request received from the client;

receiving the lock file deletion request sent by the service replacement process before the lifecycle of the lock file expires, the lock file deletion request including the SPI of the service replacement process and the transaction ID generated during creation of the lock file; and deleting the lock file created by the service process, the deleting further comprises:

determining whether the transaction ID in the lock file deletion request is consistent with the transaction ID generated during creation in the lock file for the distributed lock of the server, and in response to the transaction ID in the lock file deletion request being consistent with the generated transaction ID, deleting the lock file created by the service process, feeding back a deletion success to the service replacement process, and acquiring a request sent by the service replacement process for creating a new lock file for the distributed lock.

19. The non-transitory computer-readable medium of claim 18, wherein after feeding back whether the lock file is deleted successfully, the method further comprises:

feeding back a lock file contention failure to the service replacement process in response to the deletion failing.

* * * * *